United States Patent
Yoon

(10) Patent No.: US 11,157,719 B2
(45) Date of Patent: Oct. 26, 2021

(54) ELECTRONIC DEVICE AND METHOD FOR RECOGNIZING FINGERPRINT BASED ON DRAG INPUT

(71) Applicant: Samsung Electronics Co., Ltd., Gyeonggi-do (KR)

(72) Inventor: Jun Yoon, Gyeonggi-do (KR)

(73) Assignee: Samsung Electronics Co., Ltd

( * ) Notice: Subject to any disclaimer, the term of this patent is extended or adjusted under 35 U.S.C. 154(b) by 0 days.

(21) Appl. No.: 16/744,678

(22) Filed: Jan. 16, 2020

(65) Prior Publication Data

US 2020/0234020 A1 Jul. 23, 2020

(30) Foreign Application Priority Data

Jan. 17, 2019 (KR) ........................ 10-2019-0006147

(51) Int. Cl.
*G06F 21/32* (2013.01)
*G06K 9/00* (2006.01)
*G06F 3/0488* (2013.01)

(52) U.S. Cl.
CPC ........... *G06K 9/001* (2013.01); *G06F 3/0488* (2013.01); *G06F 21/32* (2013.01); *G06K 9/0008* (2013.01)

(58) Field of Classification Search
CPC ...... G06F 21/32; G06F 3/0412; G06F 3/0488; G06K 9/00026; G06K 9/00906; G06K 9/00087; G06K 9/001; G06K 9/0008; H04L 9/3231; H01L 41/047
USPC .......................................... 382/124; 713/186
See application file for complete search history.

(56) References Cited

U.S. PATENT DOCUMENTS

| | | | |
|---|---|---|---|
| 2006/0078176 A1* | 4/2006 | Abiko ................ | G06K 9/00026 382/124 |
| 2015/0074418 A1* | 3/2015 | Lee ......................... | G06F 21/32 713/186 |
| 2017/0019699 A1 | 1/2017 | Kim et al. | |
| 2017/0032169 A1* | 2/2017 | Pi ........................ | G06K 9/00906 |
| 2017/0351850 A1* | 12/2017 | Jin ........................ | H04L 9/3231 |
| 2017/0364726 A1* | 12/2017 | Buchan ................. | H01L 41/047 |
| 2018/0196990 A1* | 7/2018 | Xu ...................... | G06K 9/00087 |
| 2019/0197282 A1* | 6/2019 | Gong .................... | G06F 3/0412 |

FOREIGN PATENT DOCUMENTS

KR 101815514 1/2018

* cited by examiner

*Primary Examiner* — Abdul-Samad A Adediran
(74) *Attorney, Agent, or Firm* — The Farrell Law Firm, P.C.

(57) ABSTRACT

An electronic device includes a display, a memory configured to store instructions, a fingerprint sensor configured to obtain first fingerprint information regarding a finger contacting the display, and a processor, and when executing the instructions, the processor is configured to while displaying a first screen on the display, receive a first drag input from a user's finger contacting the display; obtain the first fingerprint information regarding the finger by using the fingerprint sensor while the first drag input is maintained; and, based on it being identified that the fingerprint information matches first reference fingerprint information, display a second screen converted from the first screen at least partially on the display.

18 Claims, 29 Drawing Sheets

ELECTRONIC DEVICE AND METHOD FOR RECOGNIZING FINGERPRINT BASED ON DRAG INPUT

CROSS-REFERENCE TO RELATED APPLICATION(S)

This application is based on and claims priority under 35 U.S.C. § 119 to Korean Patent Application No. 10-2019-0006147, filed on Jan. 17, 2019, in the Korean Intellectual Property Office, the disclosure of which is incorporated by reference herein in its entirety.

BACKGROUND

1. Field

The present disclosure generally relates to an electronic device which recognizes a fingerprint based on a drag input, and a method thereof.

2. Description of Related Art

Methods of authenticating users by using fingerprints are used to enhance security of electronic devices. An electronic device may include a fingerprint sensor to obtain fingerprint information to authenticate a user by using a fingerprint.

There is an increasing need for inclusion of a fingerprint sensor disposed in an electronic device to improve convenience. Therefore, it would be advantageous to provide a method for recognizing a fingerprint based on a drag input on a display.

SUMMARY

The present disclosure has been made to address the above-mentioned problems and disadvantages, and to provide at least the advantages described below.

In accordance with an aspect of the disclosure, an electronic device includes a display, a memory configured to store instructions, a fingerprint sensor configured to obtain first fingerprint information regarding a finger contacting the display, and a processor, and when executing the instructions, the processor may be configured to, while displaying a first screen on the display, receive a first drag input from a user's finger contacting the display; obtain the first fingerprint information regarding the finger by using the fingerprint sensor while the first drag input is maintained; and, based on it being identified that the first fingerprint information matches first reference fingerprint information, display a second screen converted from the first screen at least partially on the display.

In accordance with another aspect of the disclosure, a method for operating an electronic device includes displaying a screen for registering first fingerprint information; while displaying the screen for registering the first fingerprint information on a display of the electronic device, receiving a first drag input from a finger of a user contacting the display; obtaining the first fingerprint information regarding the finger by using a fingerprint sensor of the electronic device while the first drag input is maintained; and registering the first fingerprint information as reference fingerprint information for authenticating the user.

BRIEF DESCRIPTION OF THE DRAWINGS

The above and other aspects, features, and advantages of certain embodiments of the disclosure will be more apparent from the following description taken in conjunction with the accompanying drawings, in which.

DETAILED DESCRIPTION

Figure 1:
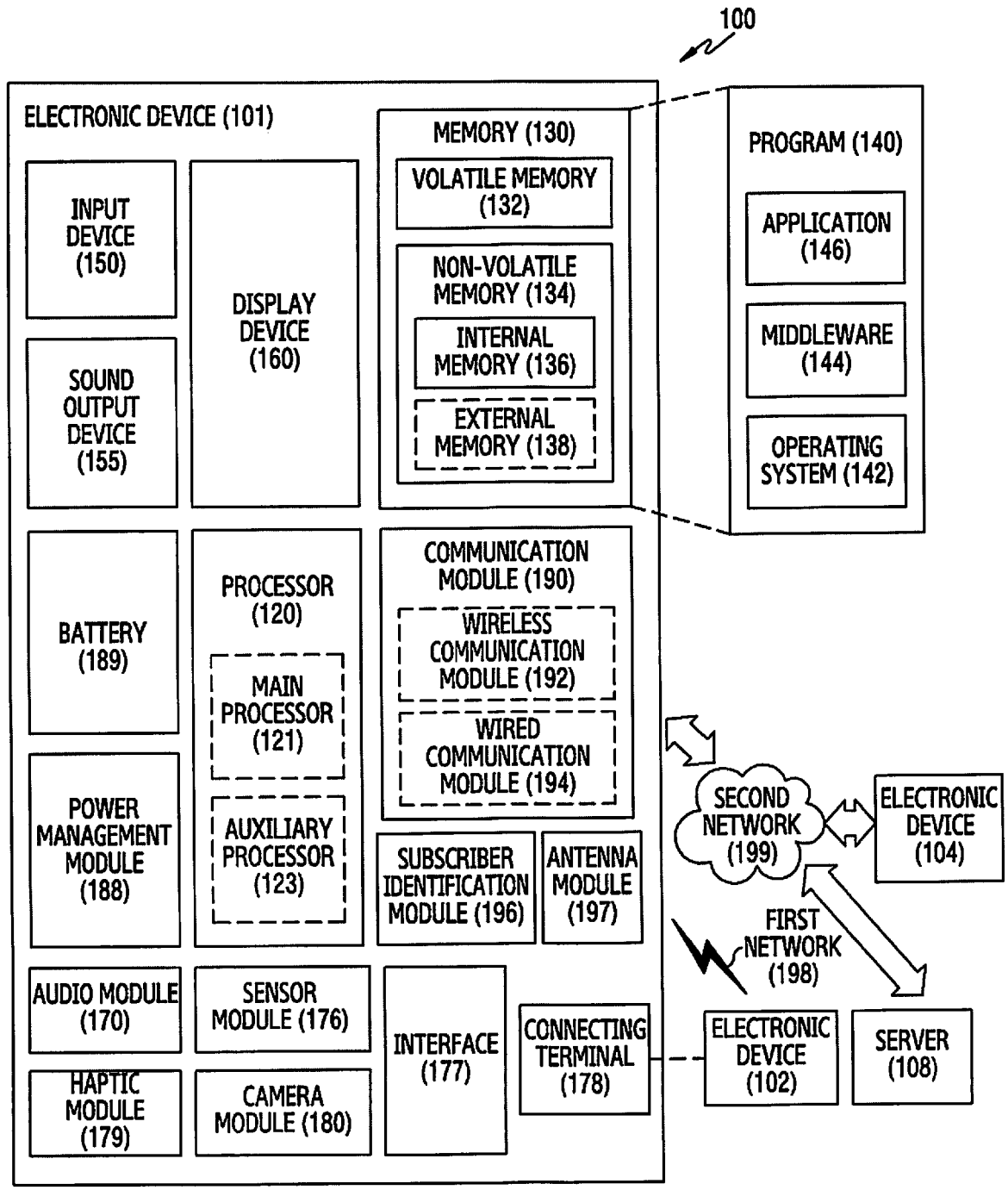
FIG. 1 is a block diagram of an electronic device in a network environment, according to an embodiment.

Various embodiments of the present disclosure are described with reference to the accompanying drawings. However, various embodiments of the present disclosure are not limited to particular embodiments, and it should be understood that modifications, equivalents, and/or alternatives of the embodiments described herein can be variously made. With regard to description of drawings, similar components may be marked by similar reference numerals.

FIG. 1 is a block diagram illustrating an electronic device 101 in a network environment 100 according to various embodiments. Referring to FIG. 1, the electronic device 101 in the network environment 100 may communicate with an electronic device 102 via a first network 198 (e.g., a short-range wireless communication network), or an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input device 150, a sound output device 155, a display device 160, an audio module 170, a sensor module 176, an interface 177, a haptic module 179, a camera module 180, a power management module 188, a battery 189, a communication module 190, a subscriber identification module (SIM) 196, or an antenna module 197. In some embodiments, at least one (e.g., the display device 160 or the camera module 180) of the components may be omitted from the electronic device 101, or one or more other components may be added in the electronic device 101. In some embodiments, some of the components may be implemented as single integrated circuitry. For example, the sensor module 176 (e.g., a fingerprint sensor, an iris sensor, or an illuminance sensor) may be implemented as embedded in the display device 160 (e.g., a display).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may load a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), and an auxiliary processor 123 (e.g., a graphics processing unit (GPU), an image signal processor (ISP), a sensor hub processor, or a communication processor (CP)) that is operable independently from, or in conjunction with, the main processor 121. Additionally or alternatively, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display device 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an ISP or a CP) may be implemented as part of another component (e.g., the camera module 180 or the communication module 190) functionally related to the auxiliary processor 123.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input device 150 may receive a command or data to be used by another component (e.g., the processor 120) of the electronic device 101, from the outside (e.g., a user) of the electronic device 101. The input device 150 may include, for example, a microphone, a mouse, a keyboard, or a digital pen (e.g., a stylus pen).

The sound output device 155 may output sound signals to the outside of the electronic device 101. The sound output device 155 may include, for example, a speaker or a receiver. The speaker may be used for general purposes, such as playing multimedia or playing a record, and the receiver may be used for an incoming calls. According to an embodiment, the receiver may be implemented as separate from, or as part of, the speaker.

The display device 160 may visually provide information to the outside (e.g., a user) of the electronic device 101. The display device 160 may include, for example, a display, a hologram device, or a projector and control circuitry to control a corresponding one of the display, hologram device, and projector. According to an embodiment, the display device 160 may include touch circuitry adapted to detect a touch, or sensor circuitry (e.g., a pressure sensor) adapted to measure the intensity of force incurred by the touch.

The audio module 170 may convert a sound into an electrical signal and vice versa. According to an embodiment, the audio module 170 may obtain the sound via the input device 150, or output the sound via the sound output device 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, an HDMI connector, a USB connector, an SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, ISPs, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more CPs that are operable independently from the processor 120 (e.g., the AP) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or Infrared Data Association (IrDA)) or the second network 199 (e.g., a long-range communication network, such as a cellular network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The antenna module 197 may transmit or receive a signal or power to or from the outside (e.g., the external electronic device) of the electronic device 101. According to an embodiment, the antenna module 197 may include an antenna including a radiating element composed of a conductive material or a conductive pattern formed in or on a substrate (e.g., PCB). According to an embodiment, the antenna module 197 may include a plurality of antennas. In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 and 104 may be a device of a same type as, or a different type, from the electronic device 101. According to an embodiment, all or some of the operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, or client-server computing technology may be used, for example.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise.

As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used herein, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

A method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

Figure 2:
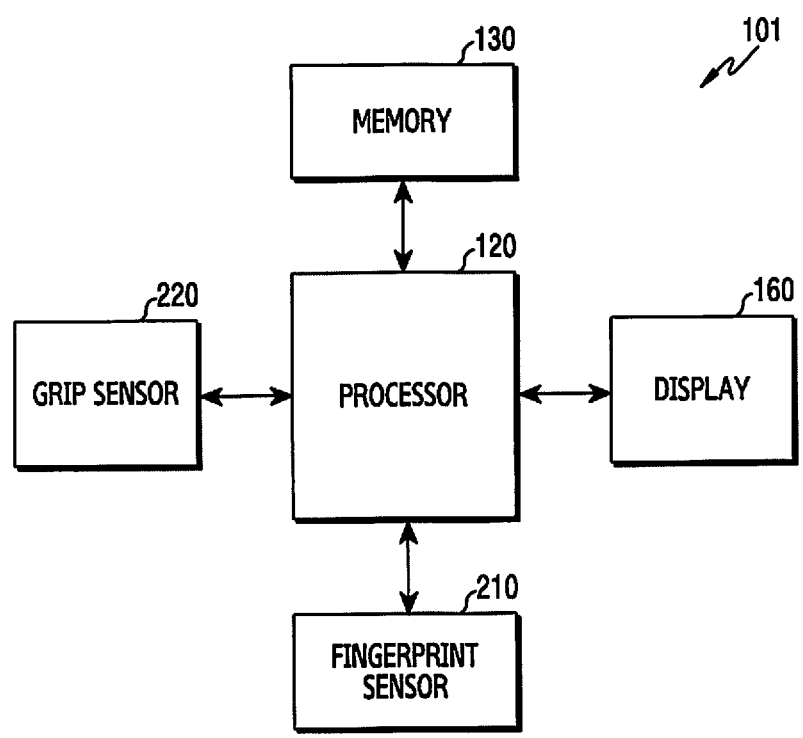
FIG. 2 is a block diagram illustrating an example of a functional configuration of an electronic device, according to an embodiment.

FIG. 2 illustrates an example of a functional configuration of an electronic device, according to an embodiment. The functional configuration may be included in the electronic device 101 shown in FIG. 1.

Referring to FIG. 2, the electronic device 101 includes processor 120, a memory 130, a display 160, a fingerprint sensor 210, and a grip sensor 220.

The display 160 may be a display device. The fingerprint sensor 210 may be included in the sensor module 176 shown in FIG. 1, and may be embedded in the display device 160. The grip sensor 220 may be included in the sensor module 176.

The processor 120 and the memory 140 may be disposed in a housing of the electronic device 101. The housing may be used to mount the other components (for example, the display 160, the fingerprint sensor 210, and the grip sensor 220) in the electronic device 101.

The display 160 may be disposed in the housing. The display 160 may be exposed through at least part of a first surface of the housing.

The grip sensor 220 may be disposed in the housing.

At least part of the fingerprint sensor 210 may be disposed under or over the display 160, or may be disposed in the display 160. Examples of arrangement of the fingerprint sensor 210 will be described with reference to FIGS. 13A, 13B, 14A, 14B, 14C, 14D, 14E, 14F, 14G, 15, 16A, 16B, and 17.

The fingerprint sensor 210 may recognize a fingerprint based on various methods. For example, the fingerprint sensor 210 may be implemented by using an ultrasonic fingerprint sensor which emits ultrasonic waves and recognizes a fingerprint based on reflected waves of the emitted ultrasonic waves. In another example, the fingerprint sensor 210 may be implemented by using an optical fingerprint sensor which emits light and recognizes a fingerprint based on a reflection of the emitted light. In another example, the fingerprint sensor 210 may be implemented by using a capacitive fingerprint sensor which recognizes a fingerprint based on a change in capacitance.

The fingerprint sensor 210 may obtain fingerprint images regarding a user's finger contacting the display 160.

The processor 120 may display a first screen on the display 160.

The first screen may include a lock screen. The lock screen may be used to indicate that the electronic device 101 is in a lock state. The lock state may indicate a state in which the functionality of the electronic device 101 is limited to execution of only some functions supportable by the electronic device 101. For example, some of the supportable functions may include a function of sending an emergency call, a function of obtaining an image by using a camera, a function of inputting a user memo, a function of releasing the lock state, or a combination thereof.

The first screen may include an always on display (AOD) screen. The AOD screen may be used to indicate that the electronic device 101 is in an AOD state. The AOD state may indicate a state in which the processor 120 is in a sleep state during at least part of a period in which a screen is displayed through the display 160. The AOD state may refer to a mode in which power is obtained from an internal power source of the processor 123 included in the display 160. The AOD state may be referred to as a self-display state in that a screen is displayed according to an operation of the processor included in the display 160. The AOD state may include a plurality of sub states. For example, the AOD state may include an AOD self-animation state. The AOD self-animation state may refer to a mode in which, while the processor 120 is in the sleep state, the processor included in the display 160 provides an animation through the display 160 by scanning a plurality of images included in frame data stored in an internal memory in the processor in sequence. The AOD state may include an AOD non-self-animation state. The AOD non-self-animation state may refer to a state in which, when an event is detected in the AOD state, an animation is provided by using frame data provided from the processor 120 for every frame based on the detected event. However, this should not be considered as limiting. The electronic device 101 may be in the lock state while providing the AOD state.

The first screen may refer to a black screen provided in a turn off state in which power provided to the display 160 is turned off.

The first screen may refer to a screen that requires authentication of a user.

The processor 120 may receive a drag input from a user's finger contacting the display 160 while displaying the first screen on the display 160. For example, the drag input may be received by using a touch sensor included in the display 160 or a touch sensor disposed outside the display 160 and operatively coupled with the display 160.

The processor 120 may obtain fingerprint information regarding the finger by using the fingerprint sensor 210 while the drag input is maintained. For example, the processor 120 may convert the fingerprint sensor 210 from a standby state into an active state in response to detecting that the drag input starts. The standby state may refer to a state in which less power than a predetermined reference power is provided and a boot-up is not required. In another example, the standby state may refer to a state in which power is turned off and a boot-up is required. The processor 120 may obtain the fingerprint information regarding the finger by using the fingerprint sensor 210 converted into the active state while the drag input is maintained. The fingerprint information may be a fingerprint image which is obtained by the fingerprint sensor, or a fingerprint image which is image-processed using information detected by the fingerprint sensor.

The fingerprint information may have patterns which are formed by some of a plurality of ridges and some of a plurality of valleys of a finger, thereby constituting a fingerprint. The patterns may be different from one another.

Figure 3A:
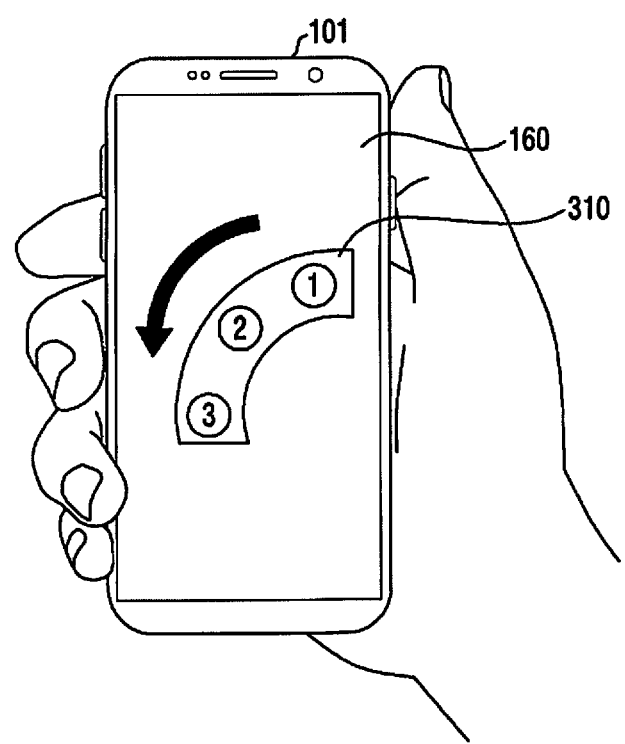
FIG. 3A illustrates an operation of recognizing a fingerprint in an electronic device, according to an embodiment.
Figure 3B:
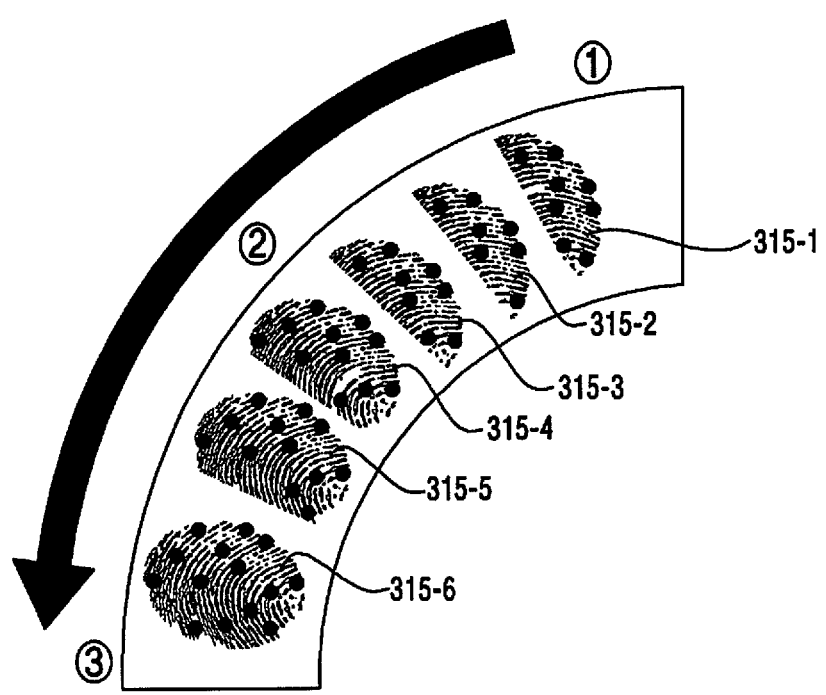
FIG. 3B illustrates an operation of recognizing a fingerprint in an electronic device, according to an embodiment.
Figure 3C:
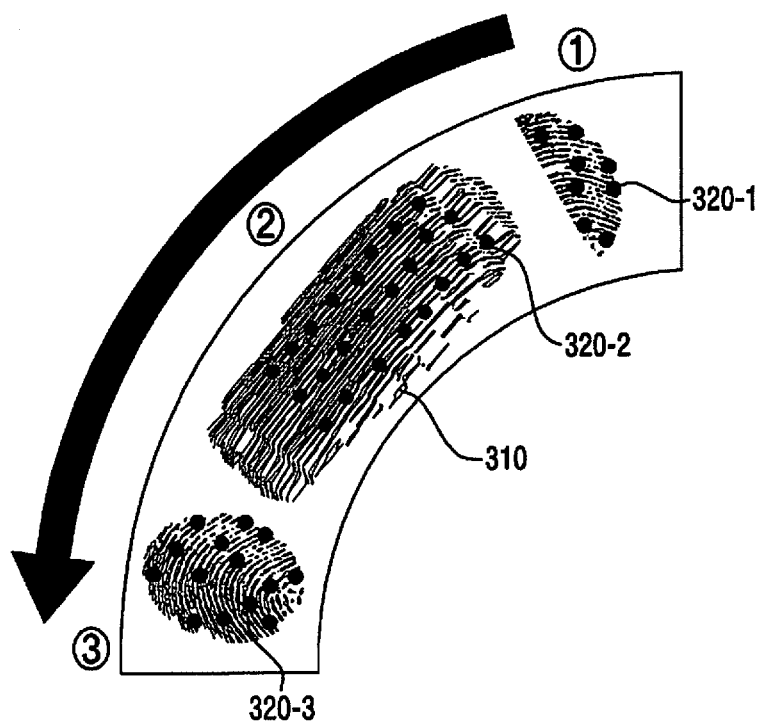
FIG. 3C illustrates an operation of recognizing a fingerprint in an electronic device, according to an embodiment.

Referring to FIGS. 3A, 3B and 3C, the processor 120 may receive a drag input 310. For example, the processor 120 may obtain fingerprint images 315-1 to 315-6 by using the fingerprint sensor 210 while the drag input 310 is maintained. Since the finger contacts different portions on the display 160 while the user provides the drag input 310, the fingerprint image 315-1 to the fingerprint image 315-6 may have different patterns. For example, a pattern of feature points extracted from the fingerprint image 315-1 may be distinct from patterns of feature points extracted from the fingerprint image 315-2 to the fingerprint image 315-6. The processor 120 may obtain fingerprint images 320-1 to 320-3 by using the fingerprint sensor 210 while the drag input 310 is maintained. The processor 120 may obtain the fingerprint image 320-1 at a position where the drag input 310 starts, may obtain the fingerprint image 320-2 swiped from the finger moving after the drag input 310 starts until the drag input 310 is released, and may obtain the fingerprint image 320-3 at a position where the drag input 310 is released. Since the finger may contact different portions on the display 160 while the user provides the drag input 310, and a speed of the drag input 310 may be changed while the drag input 310 is changed, the fingerprint image 320-1 to the fingerprint image 320-3 may have different patterns or different shapes. For example, a pattern of feature points extracted from the fingerprint image 320-1 may be distinct from patterns of feature points extracted from the fingerprint image 320-2 and the fingerprint image 320-3. In addition, a size of the fingerprint image 320-2 may be distinct from sizes of the fingerprint image 320-1 and the fingerprint image 320-3.

The processor 120 may identify that the obtained fingerprint images respectively match reference fingerprint images. For example, the processor 120 may pre-register reference fingerprint images to be used to authenticate the user or to be used to release the lock state of the electronic device 101. The reference fingerprint images may be images which are registered by the user to provide the function of authenticating the user using a fingerprint in the electronic device 101 or the function of releasing the lock state of the electronic device 101 using a fingerprint in the electronic device 101. The reference fingerprint images may be images which are registered in the electronic device 101 by a drag input of the user at the fingerprint image registering step. The obtained fingerprint images matching the reference fingerprint images may respectively indicate that all of the obtained fingerprint images match the reference fingerprint images. The obtained fingerprint images matching the reference fingerprint images may respectively indicate that all of the obtained fingerprint images match the reference fingerprint images and an order in which the fingerprint images are obtained is the same as an order of the reference fingerprint images. For example, the processor 120 may authenticate the user or may unlock the electronic device 101 in response to identifying that the fingerprint image 320-1 matches a first reference fingerprint image, the fingerprint image 320-2 subsequent to the fingerprint image 320-1 matches a second reference fingerprint image subsequent to the first reference fingerprint image, and the fingerprint image 320-3 subsequent to the fingerprint image 320-2 matches a third reference fingerprint image subsequent to the second reference fingerprint image. The obtained fingerprint images respectively matching the reference fingerprint images may indicate that a designated number of fingerprint images or more from among the fingerprint images match the reference fingerprint images. For example, when a designated number K of fingerprint images or more from among N number of fingerprint images obtained by using the fingerprint sensor 210 (K is greater than or equal to 1 and is less than N) match the reference fingerprint images, the processor 120 may authenticate the user or may unlock the electronic device 101.

In response to identifying that the obtained fingerprint images respectively match the reference fingerprint images, the processor 120 may display a second screen converted from the first screen at least partially on the display 160. The second screen may refer to a screen provided when the lock state of the electronic device 101 is released. The second screen may be a home screen of the electronic device 101, or the second screen may be a user interface of an application which requests releasing of the lock state of the electronic device 101. Additionally, the second screen may be a screen which is provided when user authentication succeeds.

The processor 120 may identify a grip state of the electronic device 101 by using the grip sensor 220 in response to detecting that the drag input starts. For example, based on a degree of change of capacitance measured by the grip sensor 220 or a pattern of change of capacitance, the processor 120 may identify that the electronic device 101 gripped by a user's right hand is in a state of receiving a drag input from the thumb of the right hand, the electronic device 101 gripped by a user's left hand is in a state of receiving a drag input from the thumb of the left hand, the electronic device 101 gripped by user's right hand is in a state of receiving a drag input from the index finger of a user's left hand, or the electronic device 101 gripped by a user's left hand is in a state of receiving a drag input from the index finger of the right hand.

The processor 120 may identify reference fingerprint images corresponding to a grip state of the electronic device 101 from among the plurality of reference fingerprint images registered in the electronic device 101. The electronic device 101 may store, in a secure region of the memory 130, a first set of reference fingerprint images that the electronic device 101 gripped by a user's right hand registers based on a drag input from the thumb of the right hand, a second set of reference fingerprint images that the electronic device 101 gripped by a user's left hand registers based on a drag input from the thumb of the left hand, a third set of reference fingerprint images that the electronic device 101 gripped by a user's right hand registers based on a drag input from the index finger of the left hand, a fourth set of reference fingerprint images that the electronic device 101 gripped by a user's left hand registers based on a drag input from the index finger of the right hand, or a combination thereof. The processor 120 may identify, as the reference fingerprint images for authenticating the user or releasing the lock state of the electronic device 101, a set corresponding to a grip state of the electronic device 101 identified by using the grip sensor 220 from among the first set, the second set, the third set, the fourth set, or a combination thereof. The processor 120 may respectively compare the identified reference fingerprint images and the obtained fingerprint images, and may authenticate the user or release the lock state of the electronic device 101, based on a result of the comparison.

The processor 120 may not only compare the fingerprint images and the reference fingerprint images, but also compare a path of the drag input and a pre-registered reference path, in order to authenticate the user or to release the lock state of the electronic device 101. The path of the drag input may be identified by using the fingerprint sensor 210 or by using the touch sensor. For example, the reference path may have a shape of a user's signature or autograph registered by a user input. In another example, the reference path may have a certain shape registered by a user input in order to use not only security using a fingerprint but also security using a pattern.

The processor 120 may authenticate the user or may release the lock state of the electronic device 101, in response to identifying that the fingerprint images obtained while the drag input is received respectively match the reference fingerprint images and identifying that the path of the drag input matches the reference path.

Figure 4A:
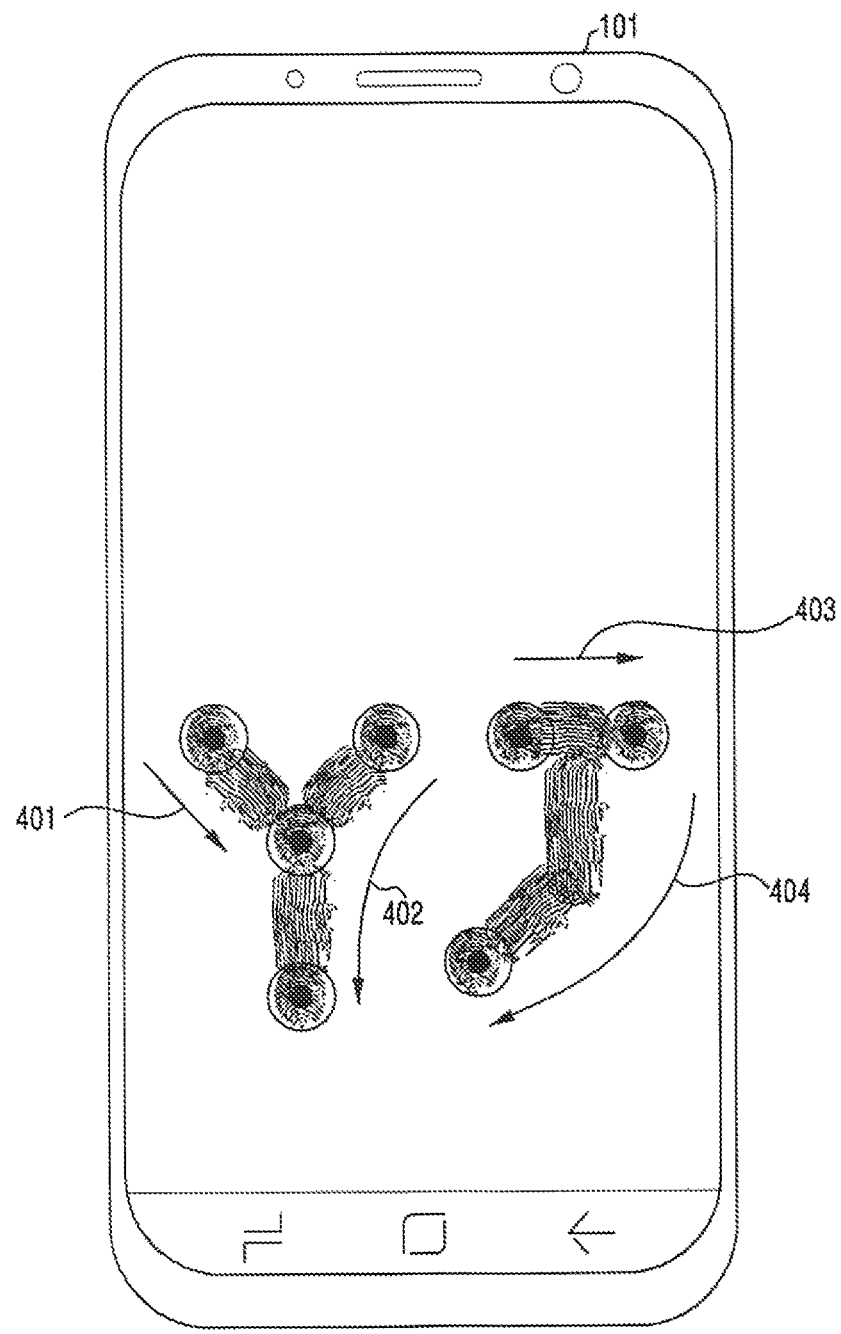
FIG. 4A illustrates an operation of authenticating by utilizing a signature and a fingerprint in an electronic device, according to an embodiment.

Referring to FIG. 4A, the processor 120 may receive a drag inputs 401-404 to authenticate the user or to release the lock state of the electronic device 101 on the display 160. In response to identifying that fingerprint images obtained while the received drag inputs 401-404 respectively match reference fingerprint images, and a path of the drag input 401, a path of the drag input 402, a path of the drag input 403, and a path of the drag input 404 respectively match reference paths, the processor 120 may authenticate the user or may release the lock state of the electronic device 101.

Figure 4B:
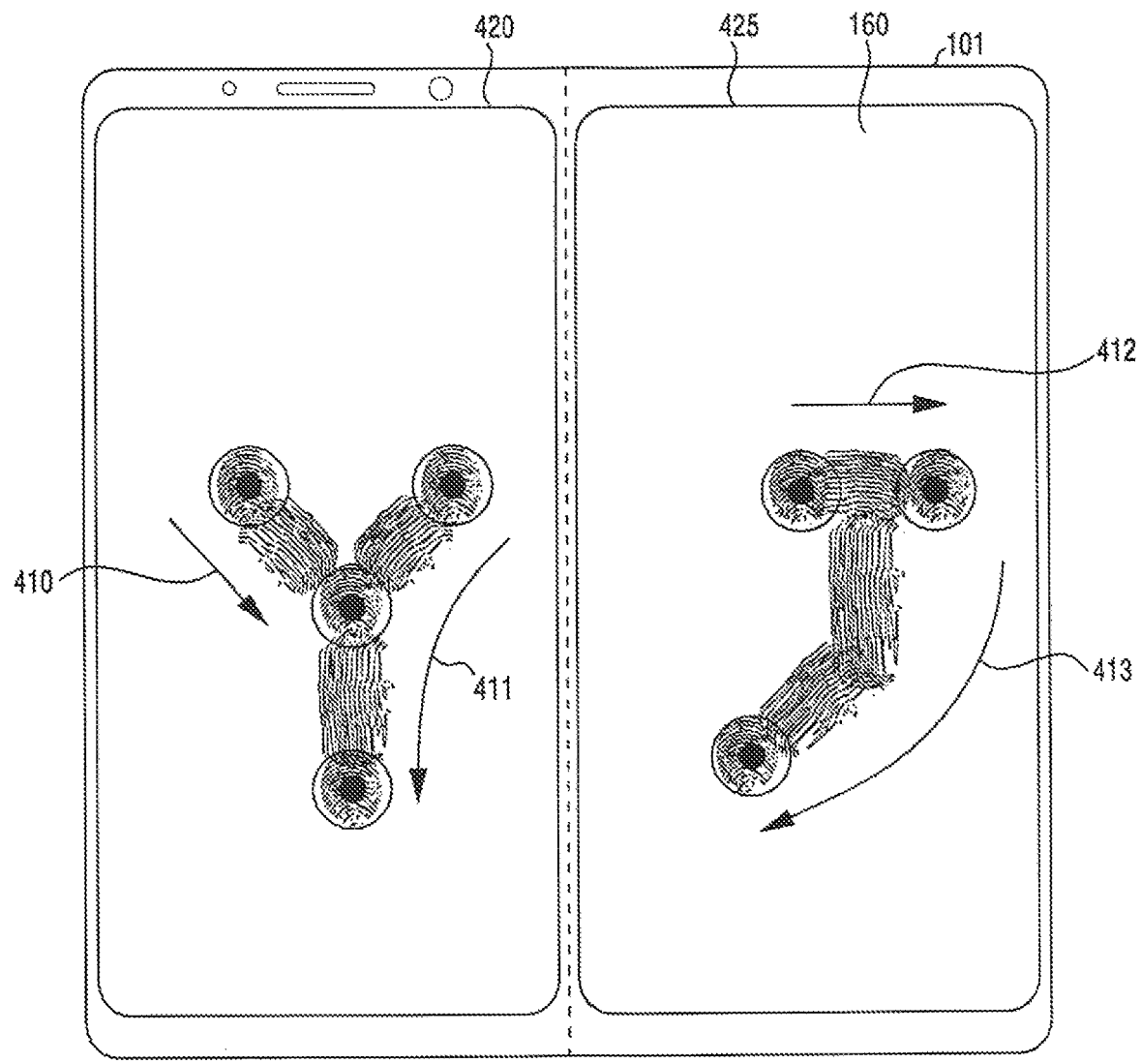
FIG. 4B illustrates an operation of authenticating by utilizing the signature and the fingerprint in the electronic device, according to an embodiment.

To authenticate the user or to release the lock state of the electronic device 101, the processor 120 may further identify locations where the drag inputs are generated, along with the drag inputs and the fingerprint images. For example, referring to FIG. 4B, the processor 120 may receive drag inputs 410-413 to authenticate the user or to release the lock state of the electronic device 101 on the display 160 configured as a flexible display. Based on identifying that fingerprint images obtained while the received drag inputs 410-413 respectively match reference fingerprint images, and a path of the drag input 410, a path of the drag input 411, a path of the drag input 412, and a path of the drag input 413 match reference paths, respectively, and the drag input 410 and the drag input 411 are received within a region 420 and the drag input 412 and the drag input 413 are received within a region 425, the processor 120 may authenticate the user or release the lock state of the electronic device 101.

Figure 4C:
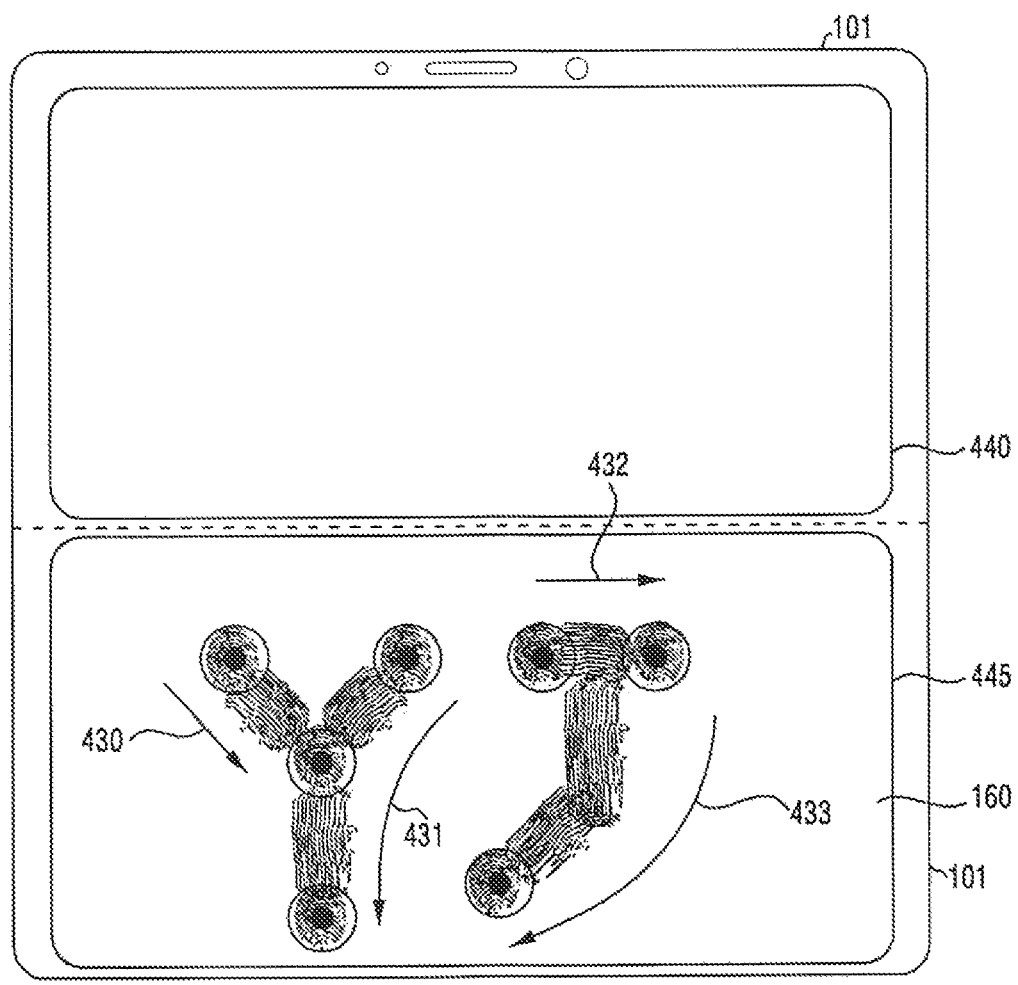
FIG. 4C illustrates an operation of authenticating by utilizing the signature and the fingerprint in the electronic device, according to an embodiment.

Referring to FIG. 4C, the processor 120 may receive drag inputs 430-433 to authenticate the user or to release the lock state of the electronic device 101 on the display 160 configured as a flexible display. Based on identifying that fingerprint images obtained while the received drag inputs 430-433 respectively match reference fingerprint images; a path of the drag input 430, a path of the drag input 431, a path of the drag input 432, and a path of the drag input 433 respectively match reference paths; and all of the drag input 430, the drag input 431, the drag input 432, and the drag input 433 are received within a region 445 out of a region 440, the processor 120 may authenticate the user or release the lock state of the electronic device 101.

In response to the user being authenticated or the lock state of the electronic device 101 being released by using the fingerprint images obtained while the drag input is maintained, the processor 120 may execute an application indicated by the path of the drag input. For example, the processor 120 may map paths of the drag inputs and applications as shown in Table 1, presented below.

TABLE 1

| Applications | Paths of Drag Inputs |
| --- | --- |
| Google ™ | "G" or "g" |
| Internet | "I" or "i" |
| Naver ™ | "N" or "n" |
| Facebook ™ | "F" or "f" |
| KaKaoTalk ™ | "K" or "k" |
| Youtube ™ | "U" or "u" |
| Other Specific Applications | Certain pattern, character, or number |

In Table 1, a relationship between the application and the path of the drag input may be defined by a user input, or may be defined by a default setting of the electronic device 101.

The processor 120 may identify the path of the drag input by using the touch sensor or the fingerprint sensor 210 while obtaining the fingerprint images from the drag input. In response to identifying that the fingerprint images respectively match the reference fingerprint images, the processor 120 may execute an application (for example, an application defined in Table 1) indicated by the identified path from among a plurality of applications installed in the electronic device 101. In response to the application being executed, the processor 120 may display the second screen which is converted from the first screen, at least partially, including a user interface of the executed application.

Figure 5:
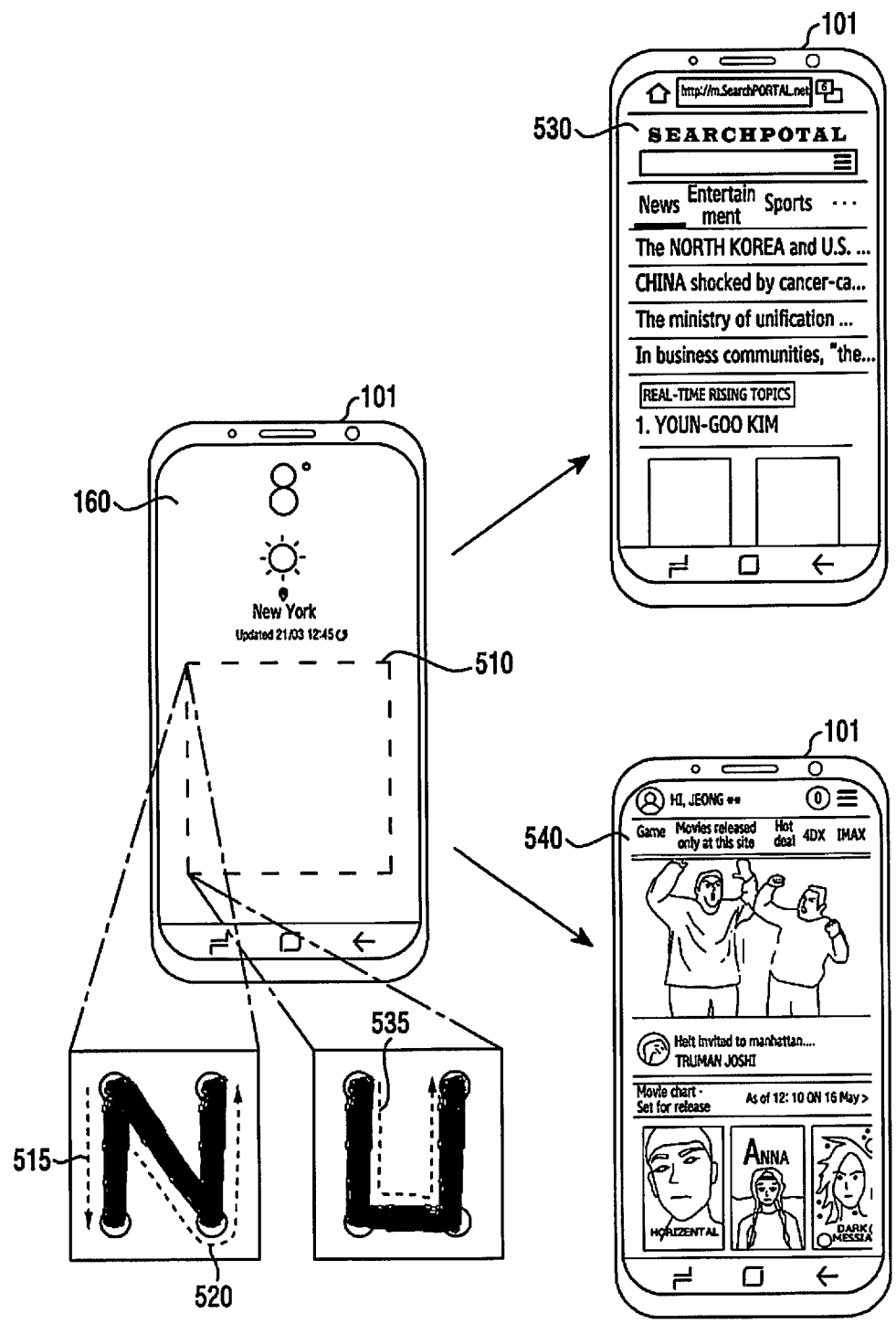
FIG. 5 illustrates an operation of executing an application by utilizing a fingerprint and a designated pattern, according to an embodiment.

Referring to FIG. 5, the processor 120 may receive a drag input 515 and a drag input 520 through at least part of a first screen 510 while displaying the first screen 510. The processor 120 may obtain fingerprint images while receiving the drag input 515 and the drag input 520. The processor 120 may identify a path of the drag input 515 and a path of the drag input 520 while obtaining the fingerprint images. In response to identifying that the fingerprint images respectively match reference fingerprint images, the processor 120 may identify the application Naver™ as an application corresponding to the path of the drag input 515 and the path of the drag input 520 from among the plurality of applications installed in the electronic device 101. In response to the application Naver™ being identified, the processor 120 may execute the application Naver™ and may display a second screen 530 which is converted from the first screen 510 and includes a user interface of the application Naver™ on the display 160.

Referring to FIG. 5, the processor 120 may receive a drag input 535 through at least part of the first screen 510 while displaying the first screen 510. The processor 120 may obtain fingerprint images while receiving the drag input 535. The processor 120 may identify a path of the drag input 535 while obtaining the fingerprint images. In response to identifying that the fingerprint images respectively match reference fingerprint images, the processor 120 may identify the application Youtube™ as an application corresponding to the path of the drag input 535 from among the plurality of applications installed in the electronic device 101. In response to the application Youtube™ being identified, the processor 120 may execute the application Youtube™ and may display a second screen 540 which is converted from the first screen 510 and includes a user interface of the application Youtube™ on the display 160.

When a plurality of drag inputs are required to authenticate the user or to release the lock state of the electronic device 101, the processor 120 may identify whether a second drag input subsequent to a first drag input is received within a designated time in response to detecting that the first drag input is released. The designated time may be a time that is defined in the electronic device 101 to monitor whether a subsequent drag input is received. The designated time may be changed by user's setting.

Based on the second drag input being received within the designated time, the processor 120 may obtain other fingerprint images distinct from fingerprint images obtained from the first drag input, while the second drag input is maintained. The processor 120 may use the other fingerprint images to authenticate the user or to release the lock state of the electronic device 101, along with the fingerprint images. The processor 120 may use a path of the second drag input to authenticate the user or to release the lock state of the electronic device 101, along with a path of the first drag input. The processor 120 may use the path of the second drag input to identify an application registered as shown in Table 1, along with the path of the first drag input.

The processor 120 may obtain information regarding the fingerprint images from the fingerprint sensor 210 by using an application executed in a secure execution environment. The secure execution environment may be distinct from a general execution environment configured in the processor 120. The secure execution environment may have higher security than the general execution environment. The general execution environment may have lower security than the secure execution environment, but does not refer to an environment where there is no configuration for security. Based on identifying that the electronic device 101 is in a state of obtaining information regarding the fingerprint images, the processor 120 may assign at least one first core of multiple cores configuring the processor 120 as a core for the secure execution environment, and may request the application executed by the at least one first core to obtain information regarding the fingerprint images by using at least one second core for the general execution environment from among the multiple cores. The application may obtain information regarding the fingerprint images received from the fingerprint sensor 210 in response to the request.

The processor 120 may respectively compare the fingerprint images and the reference fingerprint images stored in the secure region of the memory 130, by using the application executed in the secure execution environment.

The processor 120 may identify that the fingerprint images respectively match the reference fingerprint images, by using the application based on a result of the comparison. The application may transmit a signal indicating that the user is authenticated or the lock state of the electronic device 101 is released to the at least one second core for the general execution environment, based on the identification.

In response to the signal being transmitted to the at least one second core, the processor 120 may determine that the user is authenticated or the lock state of the electronic device 101 is released, and, in response to the determination, the processor 120 may display the second screen converted from the first screen at least partially.

Figure 6:
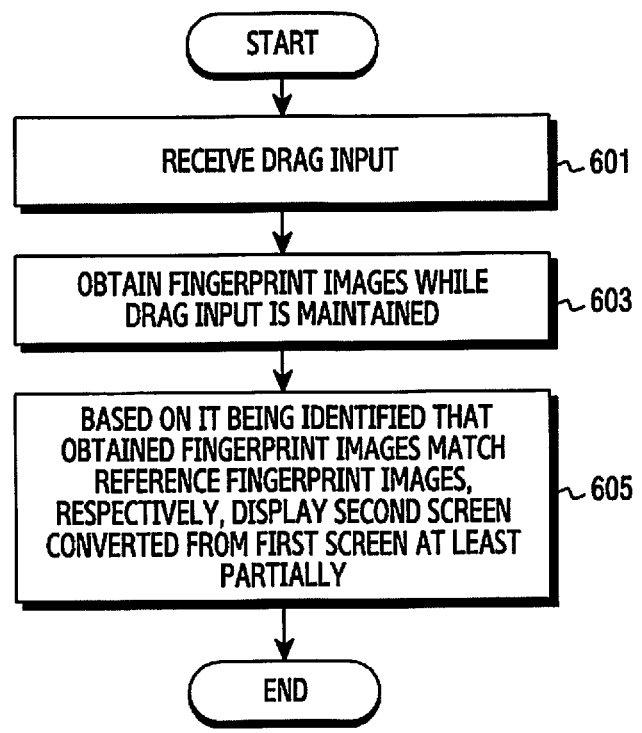
FIG. 6 is a flowchart illustrating a fingerprint authenticating operation in an electronic device, according to an embodiment.

FIG. 6 is a flowchart illustrating a fingerprint authenticating operation in an electronic device, according to an embodiment. The operation may be performed by the electronic device 101 or the processor 120 of the electronic device 101.

Referring to FIG. 6, in step 601, the processor 120 receives a drag input from a finger of a user contacting the display 160 while displaying a first screen on the display 160. For example, the first screen may include a lock screen, an AOD screen, or a black screen provided by the turned-off display 160. The first screen may include a screen which requests releasing of the lock state of the electronic device 101, or a screen which requests authentication of the user.

In step 603, the processor 120 obtains fingerprint images regarding the finger by using the fingerprint sensor 210 while the drag input is maintained. The number of fingerprint images may be determined based on a time for which the drag input is maintained and an operating frequency of the fingerprint sensor 210. The fingerprint images may have patterns which are formed by some of a plurality of ridges and some of a plurality of valleys forming fingerprints in the finger. The patterns may be different from one another since a portion of the finger contacting the display 160 may be changed while the drag input is maintained. The processor 120 may obtain the fingerprint images as independent fingerprint images while the drag input is maintained.

In step 605, based on identifying that the obtained fingerprint images respectively match the reference fingerprint images, the processor 120 displays a second screen converted from the first screen at least partially on the display 160. For example, in response to the fingerprint images being obtained, the processor 120 may identify whether the fingerprint images respectively match the reference fingerprint images, in order to determine whether to authenticate the user or to determine whether to release the lock state of the electronic device 101. Based on identifying that the fingerprint images respectively match the reference fingerprint images, the processor 120 may authenticate the user or release the lock state of the electronic device 101, and, in response to the authentication or release, the processor 120 may display the second screen converted from the first screen at least partially on the display 160. The second screen may include a screen indicating that authentication of the user is complete or a screen indicating that releasing of the lock state of the electronic device 101 is complete. The second screen may include a home screen, a screen indicating that provision of a payment service is completed, or a user interface of a finance service application which completes user authentication.

As described above, the electronic device 101 can provide an enhanced user experience by providing the service for authenticating the user by using the fingerprint or by providing the service for releasing the lock state of the electronic device 101 by using the fingerprint, by using the drag input. The electronic device 101 may obtain a plurality of fingerprint images from the drag input, such that security is improved when compared with other electronic devices which authenticate users or release the lock state based on merely an individual fingerprint image.

Figure 7:
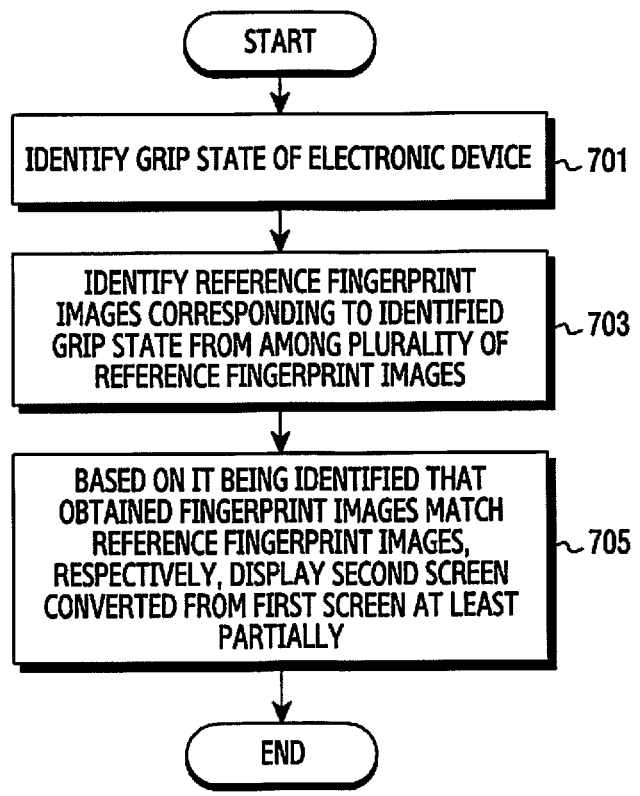
FIG. 7 is a flowchart illustrating a fingerprint authenticating operation according to a grip state of an electronic device, according to an embodiment.

FIG. 7 is a flowchart illustrating a fingerprint authenticating operation according to a grip state of an electronic device, according to an embodiment. The operation may be performed by the electronic device 101 or the processor 120 of the electronic device 101.

Steps 701 to 703 of FIG. 7 may be related to step 605 of FIG. 6.

Referring to FIG. 7, in step 701, the processor 120 identifies a grip state of the electronic device 101 by using the grip sensor 220, in response to detecting that a drag input starts. For example, the processor 120 may detect that the drag input starts by using the fingerprint sensor 210 or a touch sensor operatively coupled with the display 160. In response to the detection, the processor 120 may identify whether the electronic device 101 is in a state of being gripped by the left hand and receiving the drag input from the index finger of the right hand, whether the electronic device 101 is in a state of being gripped by the left hand and receiving the drag input from the thumb of the left hand, whether the electronic device 101 is in a state of being gripped by the right hand and receiving the drag input from the index finger of the left hand, or whether the electronic device 101 is in a state of being gripped by the right hand and receiving the drag input from the thumb of the right hand.

In step 703, the processor 120 identifies reference fingerprint images corresponding to the identified grip state of the electronic device 101 from among a plurality of reference fingerprint images registered in the electronic device 101. For example, the electronic device 101 may pre-store information regarding first reference fingerprint images which are obtained based on a drag input received from the index finger of a user's right hand, second reference fingerprint images which are obtained based on a drag input received from the index finger of a user's left hand, third reference fingerprint images which are obtained based on a drag input received from the thumb of a user's right hand, fourth reference fingerprint images which are obtained based on a drag input received from the thumb of a user's left hand, or a combination thereof. The electronic device 101 may identify the reference fingerprint images from the pre-stored information based on the identified grip state.

In step 705, based on identifying that the fingerprint images obtained from the drag input respectively match the identified reference fingerprint images, the processor 120 displays the second screen converted from the first screen at least partially on the display 160.

As described above, the electronic device 101 may identify different reference fingerprint images according to a grip state of the electronic device 101, such that the electronic device 101 can provide the service for authenticating the user or the service for releasing the lock state of the electronic device 101 by using fingerprint images obtained in different states according to a grip state of the electronic device 101. The electronic device 101 can enhance a recognition rate of fingerprints by providing these services.

Figure 8:
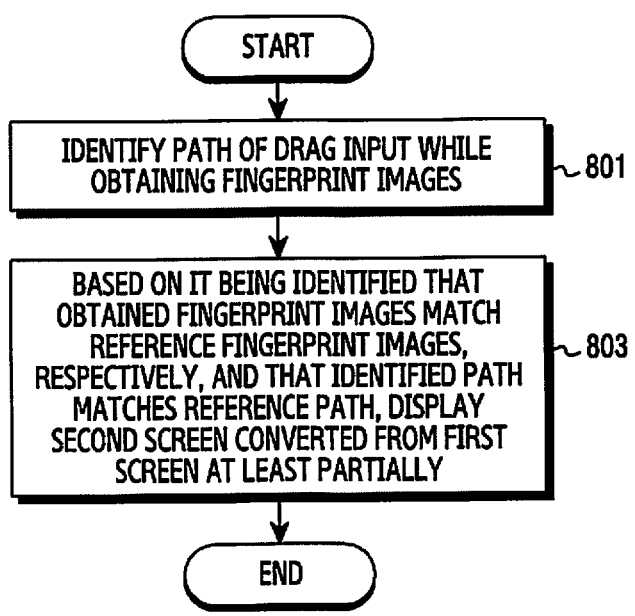
FIG. 8 is a flowchart illustrating a fingerprint authenticating operation according to a drag input in a fingerprint obtaining operation, according to an embodiment.

FIG. 8 is a flowchart illustrating a fingerprint authenticating operation according to a drag input in a fingerprint obtaining operation, according to an embodiment. The operation may be performed by the electronic device 101 or the processor 120 of the electronic device 101.

Steps 801 to 803 of FIG. 8 may be related to step 605 of FIG. 6.

Referring to FIG. 8, in step 801, the processor 120 identifies a path of a drag input while obtaining fingerprint images from the drag input. For example, the path of the drag input may be obtained by using a touch sensor operatively coupled with the display 160. In another example, the path of the drag input may be obtained by processing the fingerprint images obtained through the fingerprint sensor 210. The processor 120 may estimate the path of the drag input drawn by the fingerprint images, by combining the fingerprint images, and may identify the path of the drag input based on the estimation.

In step 803, based on identifying that the fingerprint images obtained from the drag input respectively match the identified reference fingerprint images, and the identified path of the drag input matches a reference path, the processor 120 displays the second screen converted from the first screen at least partially on the display 160. For example, the reference path may be a path which is pre-registered in the electronic device 101 in association with the reference fingerprint images. For example, the reference path may be defined based on a user input.

As described above, the electronic device 101 can provide enhanced security by authenticating the user or releasing the lock state of the electronic device 101 by further using the path of the drag input in addition to the fingerprint images obtained from the drag input.

Figure 9:
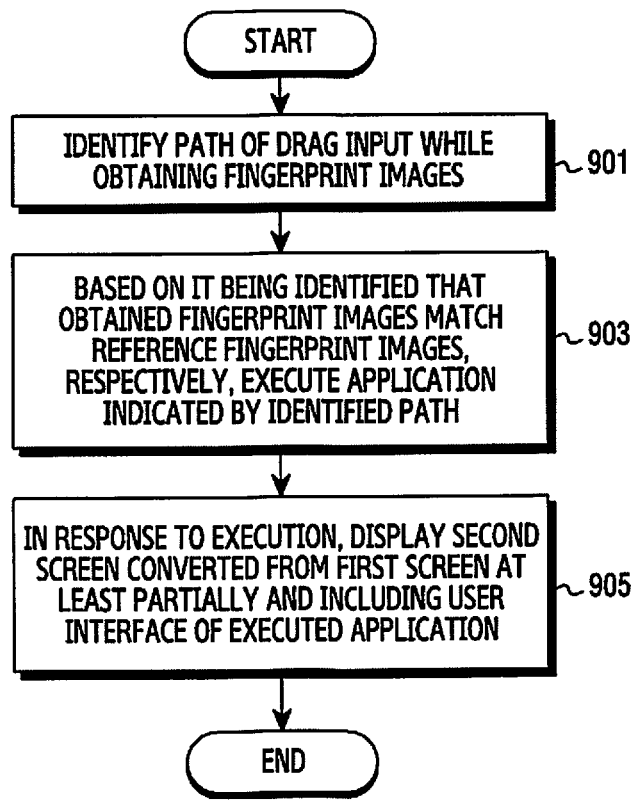
FIG. 9 is a sequence diagram illustrating an operation of determining an execution application according to a designated drag input, according to an embodiment.

FIG. 9 is a sequence diagram illustrating an operation of determining an execution application according to a designated drag input, according to an embodiment. The operation may be performed by the electronic device 101 shown in FIG. 1 or the processor 120 of the electronic device 101.

Steps 901 to 905 of FIG. 9 may be related to step 605 of FIG. 6.

Referring to FIG. 9, in step 901, the processor 120 identifies a path of a drag input while obtaining fingerprint images from the drag input. step 901 may correspond to step 801 of FIG. 8.

In step 903, in response to identifying that the fingerprint images respectively match the reference fingerprint images, the processor 120 executes an application indicated by the identified path from among the plurality of applications installed in the electronic device 101. For example, the electronic device 101 may store the database shown in Table 1 prior to receiving the drag input. In response to identifying that the fingerprint images respectively match the reference fingerprint images, the processor 120 may search the application associated with the identified path from the database. The processor 120 may execute the application based on the search.

In step 905, in response to the application being executed, the processor 120 displays the second screen which is converted from the first screen at least partially and includes a user interface of the executed application. For example, when the first screen is a lock screen, the processor 120 may not only release the lock state of the electronic device 101 but also provide the screen converted from the lock screen as a user interface of the application in response to a drag input received in the lock screen state. In other words, the electronic device 101 may provide an enhanced response to a user input for releasing the lock state of the electronic device 101.

Figure 10:
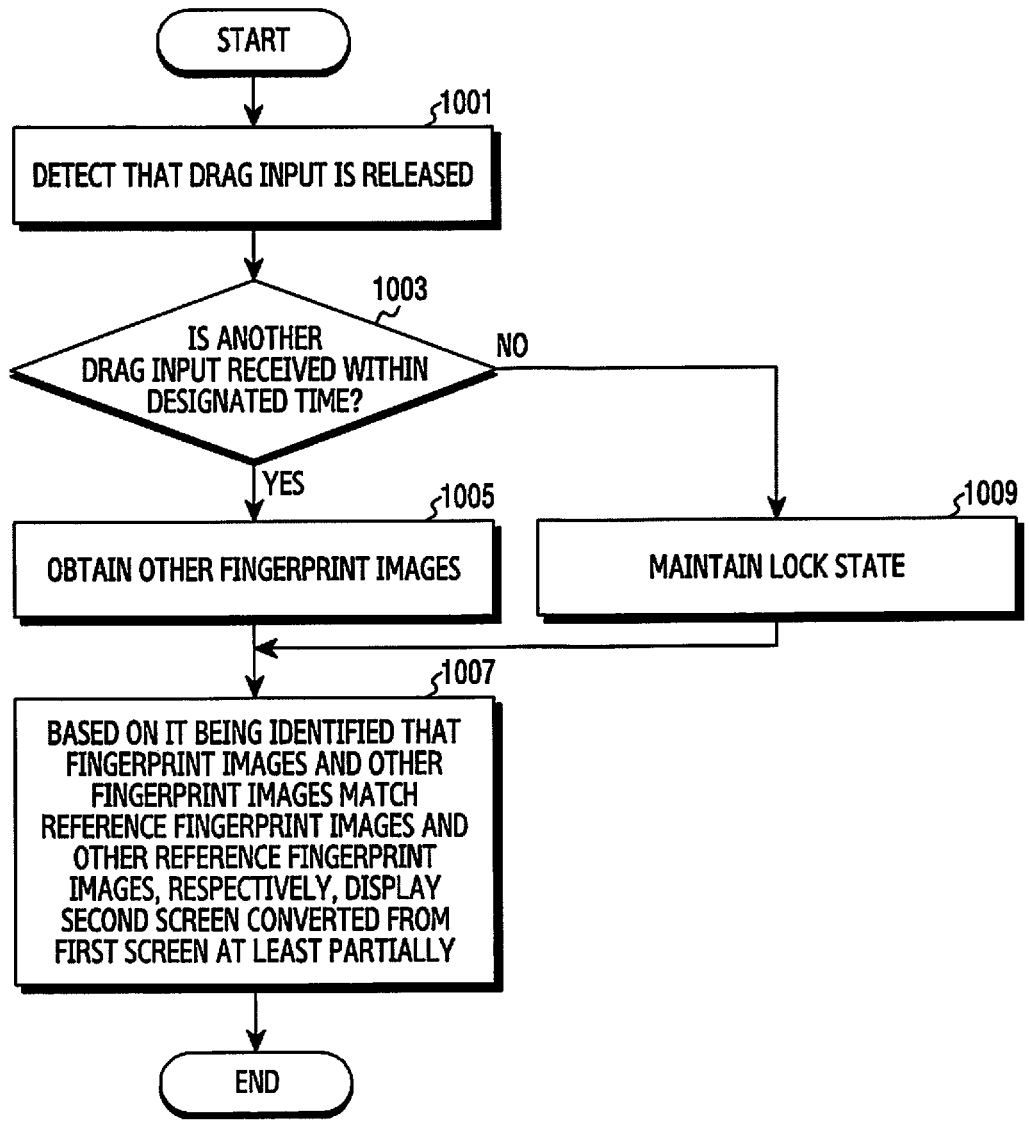
FIG. 10 is flowchart illustrating a fingerprint authenticating operation utilizing a plurality of drag inputs, according to an embodiment.

FIG. 10 is flowchart illustrating a fingerprint authenticating operation utilizing a plurality of drag inputs, according to an embodiment. The operation may be performed by the electronic device 101 or the processor 120 of the electronic device 101.

Steps 1001 to 1009 of FIG. 10 may be related to step 605 of FIG. 6.

Referring to FIG. 10, in step 1001, the processor 120 detects that a drag input used to obtain fingerprint images is released. For example, the processor 120 may obtain the fingerprint images while the drag input is maintained as in step 603. The processor 120 may detect that the drag input is released after obtaining the fingerprint images.

In step 1003, the processor 120 identifies whether another drag input subsequent to the drag input is received within a designated time, in response to the detection. For example, when setting of the electronic device 101 is defined as requesting other fingerprint images from the another drag input subsequent to the drag input, the processor 120 may identify whether the another drag input is received with the designated time in response to the detection. Based on identifying that the another drag input is received within the designated time, the processor 120 may perform step 1005. Based on identifying that the another drag input is not received within the designated time, the processor 120 may perform step 1009.

In step 1005, based on identifying that the another drag input is received within the designated time, the processor 120 may obtain other fingerprint images regarding the finger by using the fingerprint sensor 210 while the another drag input is maintained. For example, at least some of the other fingerprint images may be different from at least some of the fingerprint images.

In step 1007, based on identifying that the fingerprint images and the other fingerprint images respectively match the reference fingerprint images and other reference fingerprint images, the processor 120 displays the second screen converted from the first screen at least partially on the display 160.

In step 1009, based on identifying that the another drag input is not received within the designated time, the processor 120 maintains the lock state of the electronic device 101. For example, based on identifying that the another drag input is not received within the designated time, the processor 120 may determine that there is a difference from the setting of the electronic device 101 which is defined as requesting the other fingerprint images from the another drag input subsequent to the drag input, and based on the determination, the processor 120 may maintain the lock state of the electronic device 101 or may determine that authentication of the user fails.

FIG. 10 illustrates an example in which the user is authenticated and the lock state of the electronic device 101 is released by using the fingerprint images obtained from the drag input and the other fingerprint images obtained from the another drag input subsequent to the drag input, but the another drag input may be used in the electronic device 101 for various purposes.

For example, after identifying a path of the drag input while obtaining the fingerprint images and identifying a path of the another drag input while obtaining the other fingerprint images, in response to identifying that the fingerprint images and the other fingerprint images respectively match the reference fingerprint images and the other reference fingerprint images, and identifying that the path of the drag input and the path of the another drag input respectively match a reference path and another reference path which are pre-registered in the electronic device 101, the processor 120 may authenticate the user or release the lock state of the electronic device 101.

After identifying the path of the drag input while obtaining the fingerprint images and the path of the another drag input while obtaining the other fingerprint images, in response to identifying that the fingerprint images and the other fingerprint images respectively match the reference fingerprint images and the other reference fingerprint images, the processor 120 may authenticate the user or release the lock state of the electronic device 101, and, in response to whether the user is authenticated or the lock state is released, the processor 120 may execute an application indicated by the path of the drag input and the path of the another drag input from among the plurality of applications installed in the electronic device 101. In other words, as soon as the user is authenticated or the lock state of the electronic device 101 is released, the processor 120 may display the second screen including a user interface of the application indicated by the path of the drag input and the path of the another drag input.

Figure 11:
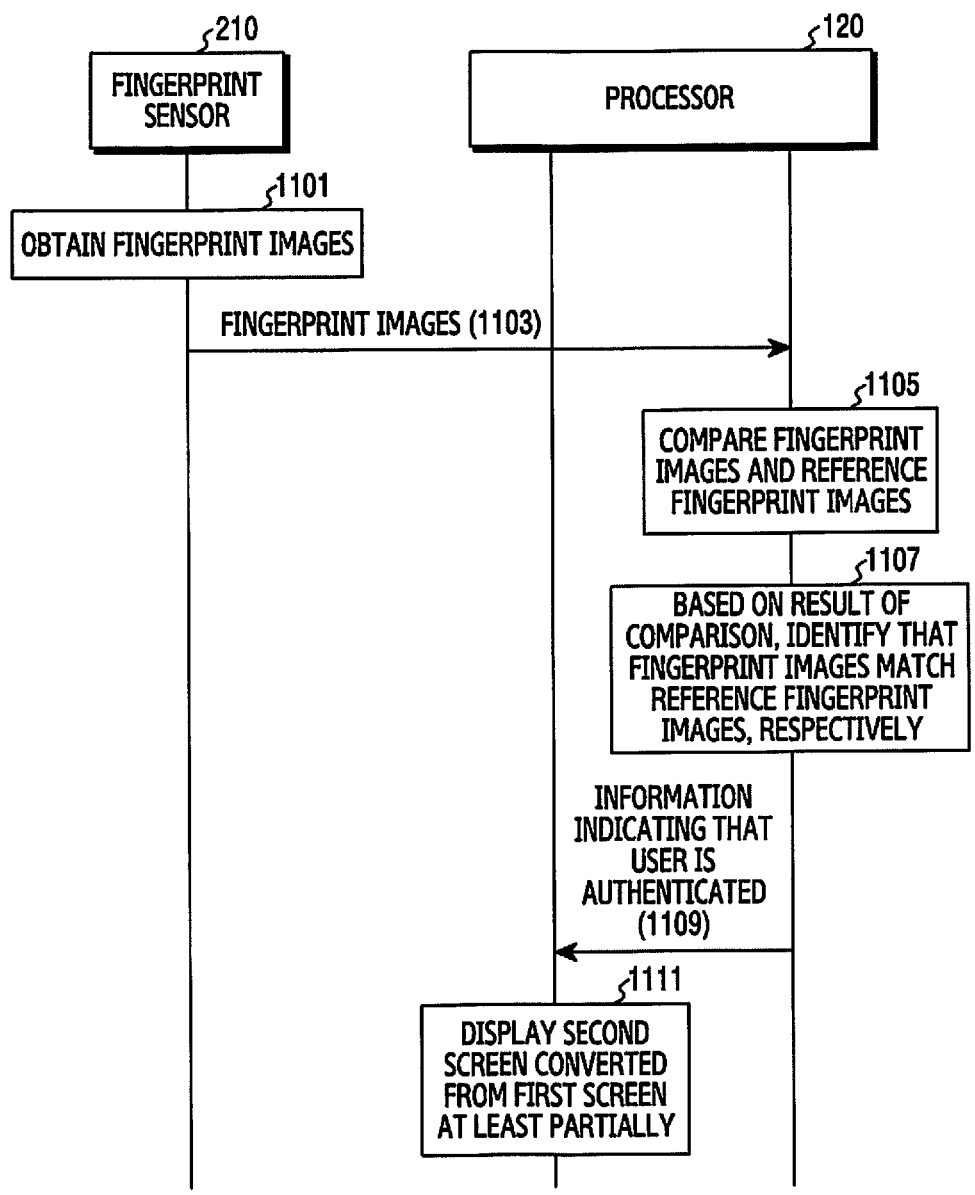
FIG. 11 illustrates signal processing of a fingerprint sensor and a processor of an electronic device, according to an embodiment.

FIG. 11 is a view illustrating signal processing of a fingerprint sensor and a processor of an electronic device, according to an embodiment. The operation may be performed by the electronic device 101 or the processor 120 of the electronic device 101.

Steps 1101 to 1111 of FIG. 11 may be related to steps 603 and 605 of FIG. 6.

Referring to FIG. 11, in step 1101, the fingerprint sensor 210 obtains fingerprint images while a drag input is maintained. The fingerprint sensor 210 may be in a standby state prior to performing step 1101. The fingerprint sensor 210 may receive a signal indicating that the drag input is received from a touch sensor operatively coupled with the display 160, and in response to the signal being received, the fingerprint sensor 210 may be converted from the standby state into an active state. The fingerprint sensor 210 may obtain the fingerprint images in response to the conversion into the active state.

In step 1103, the fingerprint sensor 210 provides the fingerprint images to the secure execution environment of the processor 120. For example, the fingerprint sensor 210 may provide the fingerprint images to an application that is executed only in the secure execution environment. The processor 120 may obtain the fingerprint images by using the application. The application may be configured to be executed only through at least one first core from multiple cores of the processor 120. While the application is being executed through the at least one first core, tasks processed through the other cores of the multiple cores may fail to recognize the state of the application, thereby enhancing security of the secure execution environment.

In step 1105, the processor 120 compares the obtained fingerprint images and reference fingerprint images stored in the secure region of the memory 130 by using the application. For example, the processor 120 may compare the obtained fingerprint images and the reference fingerprint images stored in the secure region of the memory 130 by using the application in order to determine whether to authenticate the user or whether to release the lock state of the electronic device 101. Since the processor 120 compares by using the application, the comparison may not be exposed to outside the application.

In step 1107, the processor 120 identifies that the fingerprint images respectively match the reference images by using the application based on the result of the comparison. Since the identification is performed by the application, the identification may be transparent to the tasks processed through the other cores or may be transparent to the general execution environment distinct from the secure execution environment.

In step 1109, the processor 120 provides information indicating that the user is authenticated (or information indicating that the lock state of the electronic device 101 is released) to the general execution environment by using the application, based on the identification. The comparison and the identification are operations that should not be exposed to outside the application for protecting the user's privacy, whereas the result of the comparison and the result of the identification should be exposed to perform the next steps of the operations of the electronic device 101. Therefore, the processor 120 may provide the information indicating that the user is authenticated to the general execution environment by using the application.

In step 1111, in response to the information being received, the processor 120 displays the second screen converted from the first screen at least partially on the display 160 by using another application executed in the general execution environment.

As described above, the electronic device 101 can provide enhanced security by processing the fingerprint images obtained from the drag input by using the application executed only in the secure execution environment.

Figure 12:
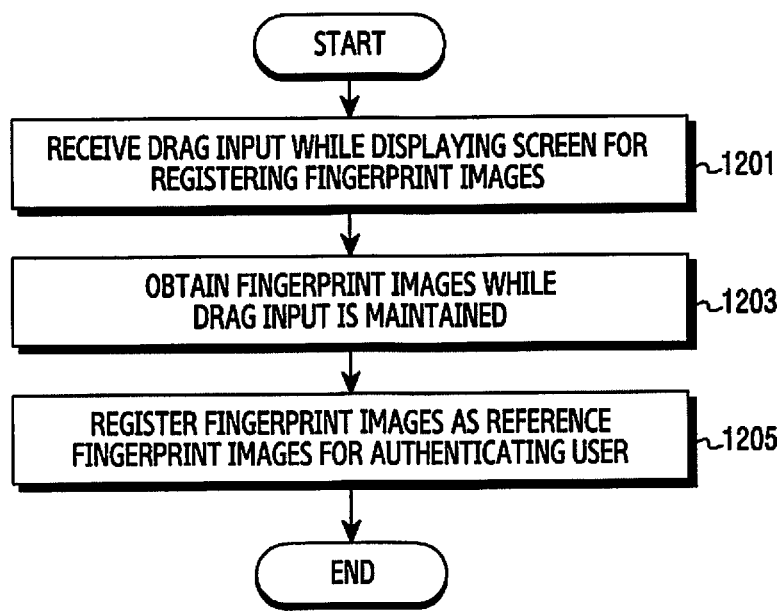
FIG. 12 is a flowchart illustrating registration of fingerprint information of an electronic device, according to an embodiment.

FIG. 12 is a flowchart illustrating registration of fingerprint information of an electronic device, according to an embodiment. The operation may be performed by the electronic device 101 or the processor 120 of the electronic device 101.

Steps 1201 to 1205 of FIG. 12 may be a premise of the steps of FIG. 6.

Referring to FIG. 12, in step 1201, the processor 120 receives a drag input from a user's finger contacting the display 160 while displaying a screen for registering fingerprint images. For example, the screen for registering the fingerprint images may include guide information regarding the drag input or guide information indicating that reception of a drag input is required to authenticate by using a fingerprint. The user may provide the drag input to the electronic device 101 to perform authentication by using a fingerprint through a drag input as in FIGS. 2, 3A, 3B, 3C, 4A, 4B, 4C, 5, 6, 7, 8, 9, 10, and 11.

In step 1203, the processor 120 obtains fingerprint images regarding the finger by using the fingerprint sensor 210 while the drag input is maintained. The obtained fingerprint images may be directly provided to the secure execution environment of the processor 120 by detouring around the general execution environment of the processor 120. The obtained fingerprint images may be directly provided to the secure execution environment of the processor 120 without passing through the general execution environment of the processor 120. This is to enhance security of the obtained fingerprint images.

In step 1205, the processor 120 registers the fingerprint images as reference fingerprint images for authenticating the user. For example, the processor 120 may respectively register the fingerprint images as the reference fingerprint images, and may store the registered reference fingerprint images in the secure region of the memory 130. The reference fingerprint images stored in the secure region of the memory 130 may be retrieved only by the application being executed in the secure execution environment.

Although FIG. 12 illustrates an example of registration of the reference fingerprint images, the electronic device 101 may further register, as reference data for authenticating the user, a path of the drag input, other fingerprint images obtained from another drag input subsequent to the drag input, a path of the another drag input, or a combination thereof, through operations in FIGS. 7, 8, 9, 10, or a combination thereof.

For example, the processor 120 may identify the path of the drag input while obtaining the fingerprint images, and may register the identified path as a reference path for authenticating the user. The reference path may be used to authenticate the user along with the reference fingerprint images.

Hereinafter, arrangement of a fingerprint device utilized for the above-described operations will be described based on FIGS. 13A, 13B, 14A, 14B, 14C, 14D, 14E, 14F, 14G, 15, 16A, 16B, and 17.

Figure 13A:
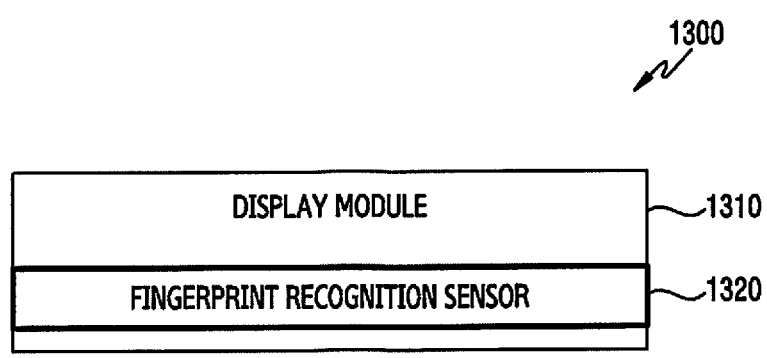
FIG. 13A is a schematic view illustrating arrangements of a display panel and a fingerprint recognition sensor, according to an embodiment.

FIG. 13A is a schematic view illustrating arrangements of a display panel and a fingerprint recognition sensor, according to an embodiment.

Referring to FIG. 13A, an electronic device 1300 may include a display module 1310 and a fingerprint sensor. The display module 1310 may include a front surface cover forming a part of a housing, and a display to deliver information by emitting light through the front surface cover. The fingerprint sensor 1320 may be included in the display module 1310. The fingerprint sensor 1320 may have a smaller area than that of the display module 1310. For example, the fingerprint sensor 1320 may be formed to have an area corresponding to a region to which a fingerprint or pattern for a fingerprint authenticating operation is inputted. In another example, when viewed from above the electronic device 1300, the fingerprint sensor 1320 may be disposed only under the display module 1310 if the fingerprint sensor 1320 is utilized for the fingerprint authenticating operation in a region under the area of the display. If the front surface of the display is utilized for the fingerprint authenticating operation, the fingerprint sensor 1320 corresponding to the whole area of the display module 1310 may be disposed.

Figure 13B:
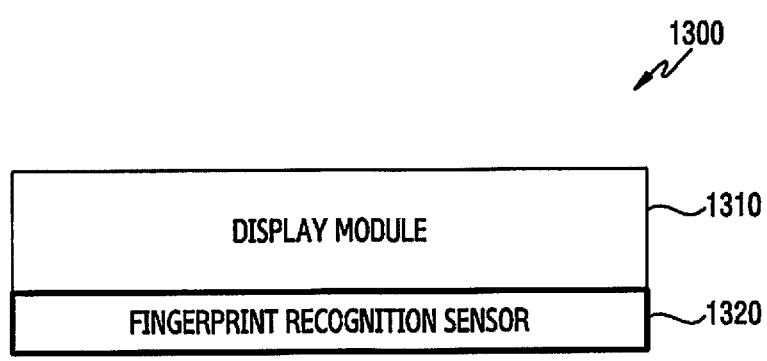
FIG. 13B is a schematic view illustrating the arrangements of the display panel and the fingerprint recognition sensor, according to an embodiment.

FIG. 13B is a schematic view illustrating the arrangements of the display panel and the fingerprint recognition sensor, according to an embodiment.

The electronic device 1300 of FIG. 13B may have the fingerprint sensor 1320 disposed under the display module 1310. The front surface cover of the display module may be formed with a transparent plate, and the transparent plate may be formed with curved glass.

Figure 14A:
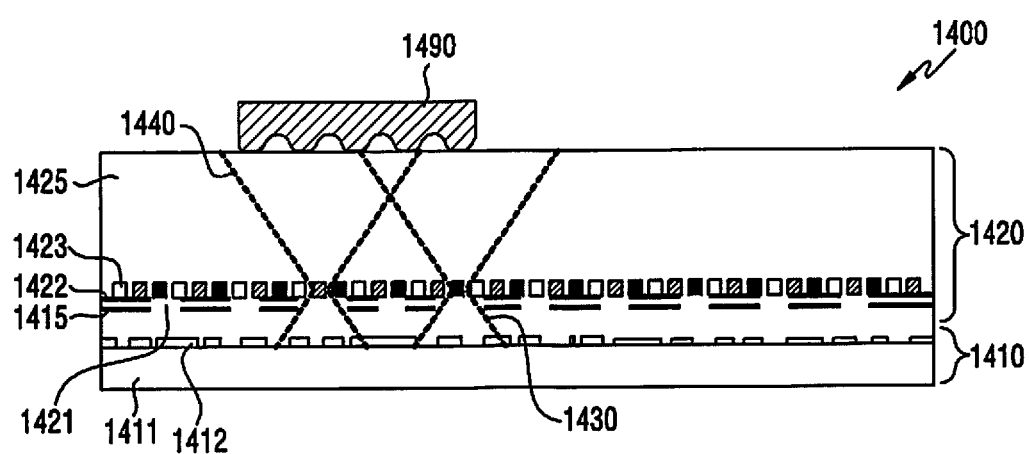
FIG. 14A illustrates arrangements of a display panel and a fingerprint recognition sensor in detail, according to an embodiment.
Figure 14B:
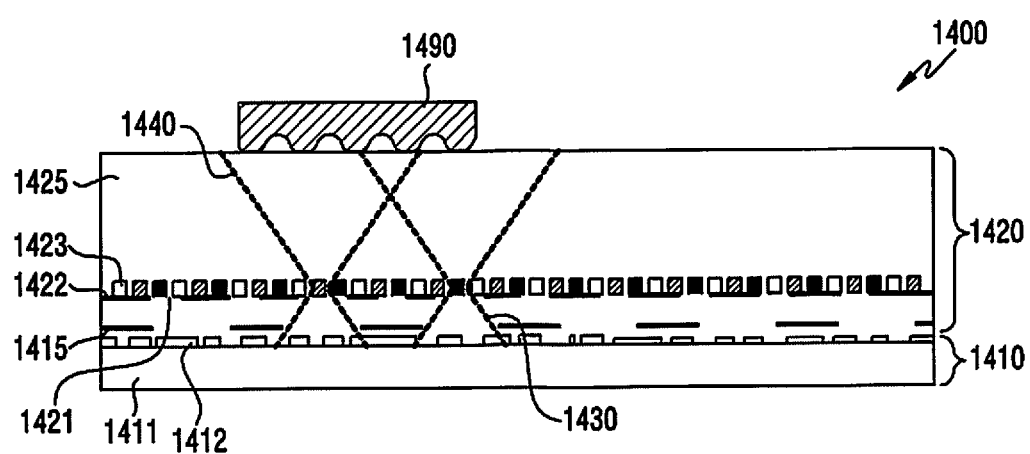
FIG. 14B illustrates arrangements of the display panel and the fingerprint recognition sensor in detail, according to an embodiment.

FIG. 14A is a view illustrating arrangements of a display panel and a fingerprint recognition sensor in detail, according to an embodiment. FIG. 14B is a view illustrating arrangements of the display panel and the fingerprint recognition sensor in detail, according to an embodiment.

Referring to FIGS. 14A and 14B, an electronic device 1400 includes a fingerprint sensor 1410 and a display module 1420 disposed on the fingerprint sensor 1410. The display module 1420 may include a display and a transparent plate 1425. The display may include a substrate 1430, a thin film transistor (TFT) pattern 1422, and a pixel 1423.

The substrate 1430 may be stacked on the fingerprint sensor 1410. The substrate 1430 may be a base plate on which the display is formed, and a panel may be formed on the substrate 1430 through a series of manufacturing processes. The panel may include the plurality of pixels 1423 and the TFT pattern 1422 to control light of each pixel. The TFT pattern 1422 may be set to selectively supply power to each of the pixels 1423, and each of the pixels 1423 may emit designated light by power or a signal supplied through the TFT pattern 1422.

The TFT pattern 1422 may be disposed between the pixel 1423 and the substrate 1430, and the TFT patterns 1422 may be formed on one surface of the substrate 1430 through a series of processes such as deposition, patterning, or etching. For example, an active layer (or a semiconductor layer) which is formed with a semiconductor material such as poly-silicon may be formed on one surface of the substrate 1430, and a gate electrode, a source electrode, and a drain electrode may be formed to drive the active layer. The source electrode may be an electrode which supplies electrons, and the drain electrode may be an electrode which receives electrons. The gate electrode may be an electrode for controlling electron movement from the source electrode to the drain electrode. The active layer may be electrically connected with the source electrode and the drain electrode. When a voltage of a predetermined level or higher is applied to the gate electrode, the active layer may serve as a path (or channel) enabling electrons to be moved, like a conductor.

The pixel 1423 may include an organic light emitting diode (OLED), and may include an anode, a cathode, and an organic material layer formed on the TFT pattern 1422 through evaporation. The anode may be an electrode which emits positive holes, the cathode may be an electrode which emits electrons, and the organic material layer may be disposed between the anode and the cathode. A current may flow to the source electrode, the active layer, and the drain electrode due to a reaction of the active layer of the TFT pattern 1422, and a voltage may be applied to the anode and the cathode of the pixel 1423 electrically connected with the TFT pattern 1422. Accordingly, electrons discharged from the cathode and positive holes discharged from the anode may be coupled to each other in the organic material layer, and exciton energy may be discharged from the organic material layer in the form of light due to the coupling of the electrons and the holes. The pixel 1423 may be substituted with a light emitting element of a structure different from the OLED.

The TFT pattern 1422 may be a low temperature polycrystalline silicon (LTPS)-based TFT, or the TFT pattern 1422 may be an amorphous silicon (a-Si)-based TFT.

An encapsulation layer may be additionally included on an upper portion of the pixel 1423 to prevent oxidation of metal such as an electrode included in the pixel 1423, and an organic film layer may be additionally included.

The transparent plate 1425 may be stacked on the upper portion of the pixel 1423. The transparent plate 1425 may allow at least one light displayed on the pixel 1423 to transmit therethrough. The transparent plate 1425 may be formed with at least one material of a polymer material, such as polycarbonate (PC) of a polymer material, polymethylmethacrylate (PMMA), polyimide (PI), polyethylene terephthalate (PET), polypropylene terephthalate (PPT), or glass. The transparent plate 125 may include a multilayered structure formed with various materials.

The fingerprint sensor 1410 may include a base substrate 1411 and a TFT pattern 1412 for the fingerprint sensor formed on the base substrate 1411. The TFT pattern 1412 for the fingerprint sensor may be patterned on the base substrate 1411, and may control a signal transmitter and a signal receiver constituting the fingerprint sensor 1410. The signal transmitter may discharge a signal for detecting a fingerprint based on power and a signal supplied to the fingerprint sensor, and the signal receiver may receive a signal reflected and returning from an external object 1490. The external object 1490 may be a fingerprint, and information such as an intensity of a signal which is reflected from a valley and a ridge formed on the external object 1490 which arrives at the receiver, or a time may be obtained, and the obtained fingerprint information may be transmitted to a processor 120 to generate a fingerprint image.

The signal transmitter of the fingerprint sensor 1410 may generate a signal 1440. The signal 1440 may be light or ultrasonic waves. A signal transmission layer 1415 may be separately provided to transmit the signal 1440 formed with light or ultrasonic waves. The signal transmission layer 1415 may have a signal transmission opening 1421 formed thereon, and the signal transmission opening 1421 may be formed to have an appropriate size according to a path of the transmitted signal.

Referring to FIG. 14A, the signal transmission layer 1415 may be formed adjacent to the TFT pattern 1422 of the display panel. The signal transmission opening 1421 may be formed to correspond to the TFT pattern 1422, and the signal transmission layer 1415 may be set to make directionality of a signal passing through the signal transmission opening 1421 constant.

Referring to FIG. 14B, the signal transmission layer 1415 is disposed to face the TFT pattern 1422 of the display panel with the substrate 1430 therebetween. A difference from FIG. 14A is that the signal transmission layer 1415 is disposed adjacent to the TFT pattern 1412 for the fingerprint sensor, and the width of the signal transmission opening 1421 is set to be large to transmit light or ultrasonic signals emitted from the fingerprint sensor 1410. The light and the ultrasonic signal may be formed to arrive at a region having no TFT pattern 1422 due to the straightness of the TFT pattern 1422.

Figure 14C:
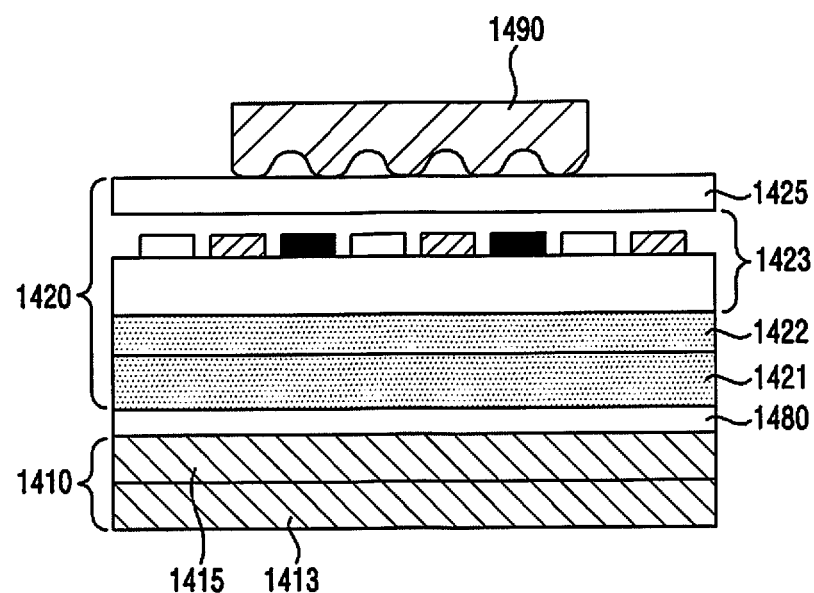
FIG. 14C illustrates arrangements of the display panel and the fingerprint recognition sensor in detail, according to an embodiment.

FIG. 14C is a view illustrating arrangements of the display panel and the fingerprint recognition sensor in detail, according to an embodiment.

Referring to FIG. 14C, a fingerprint sensor 1410 is formed outside a display module 1420. The display module 1420 and the fingerprint sensor 1410 may be the same as or similar to the configurations of the display module and the fingerprint sensor of FIG. 14B.

The display module 1420 may include a substrate 1421, a TFT pattern layer 1422 stacked on the substrate 1421, a pixel layer 1423 stacked on the TFT pattern layer 1422, and the transparent plate 1425 formed on the pixel layer 1423. The TFT pattern layer 1422, the pixel layer 1423, and the transparent plate 1425 may be formed on the substrate 1421 in various processes, thereby forming one display. An additional stacking material 1480 may be formed under the display module 1420, and the additional stacking material 1480 may be an adhesive member such as an optical clear adhesive (OCA). The additional stacking material 1480 may attach the fingerprint sensor 1410 and the display module 1420 to each other.

The fingerprint sensor 1410 may include a signal transmission layer 1415 including an optical member such as a lens, a collimator, or a pin hole. The optical member may adjust a light path to allow light emitted from the fingerprint sensor 1410 to be transmitted to a region where the TFT pattern is not formed, and, if a pin hole is included, the pin hole may guide a transmitted ultrasonic signal or light to advance toward a region where the TFT pattern is not formed. A TFT fingerprint sensor panel 1413 may be disposed under the signal transmission layer 1415 to emit a signal for recognizing a fingerprint. The additional stacking material 1480 may be stacked on a surface of the signal transmission layer 1415, such that the signal transmission layer 1415 can be attached to the display module 1420.

Figure 14D:
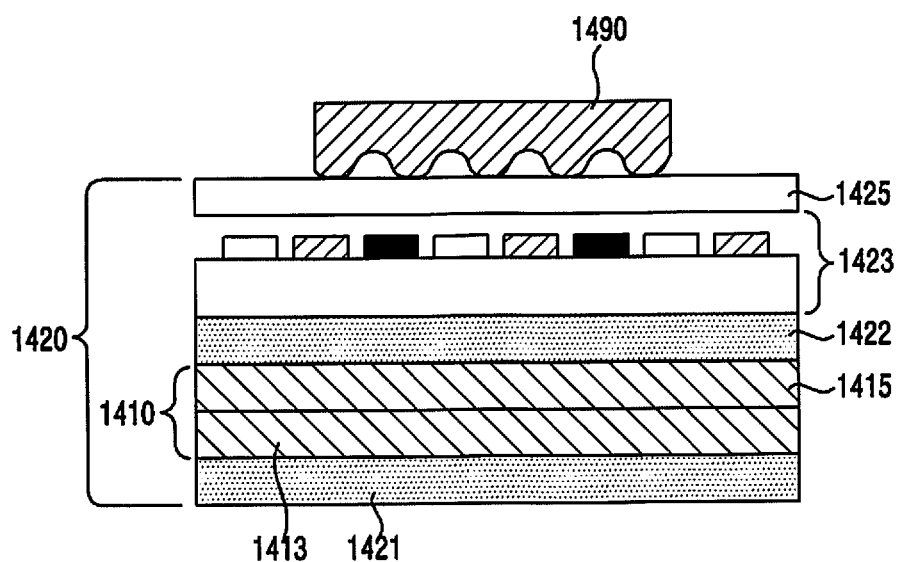
FIG. 14D illustrates arrangements of the display panel and the fingerprint recognition sensor in detail, according to an embodiment.

FIG. 14D is a view illustrating arrangements of the display panel and the fingerprint recognition sensor in detail, according to an embodiment.

Referring to FIG. 14D, the fingerprint sensor 1410 is included in the display module 1420. The display module 1420 may include the fingerprint sensor 1410 stacked on the substrate 1421, the TFT pattern layer 1422 stacked on the fingerprint sensor 1410, the pixel layer 1423 disposed on the TFT pattern layer 1422, and the transparent plate 1425 disposed on the pixel layer 1423. The fingerprint sensor 1410 may be disposed between the TFT pattern layer 1422 and the substrate 1421. For example, the signal transmission layer 1415 of the fingerprint sensor 1410 may be disposed in contact with the TFT pattern layer 1422 disposed between the TFT pattern layer 1422 and the TFT fingerprint sensor panel 1413. The TFT fingerprint sensor panel 1413 may be disposed between the signal transmission layer 1415 and the substrate 1421.

Figure 14E:
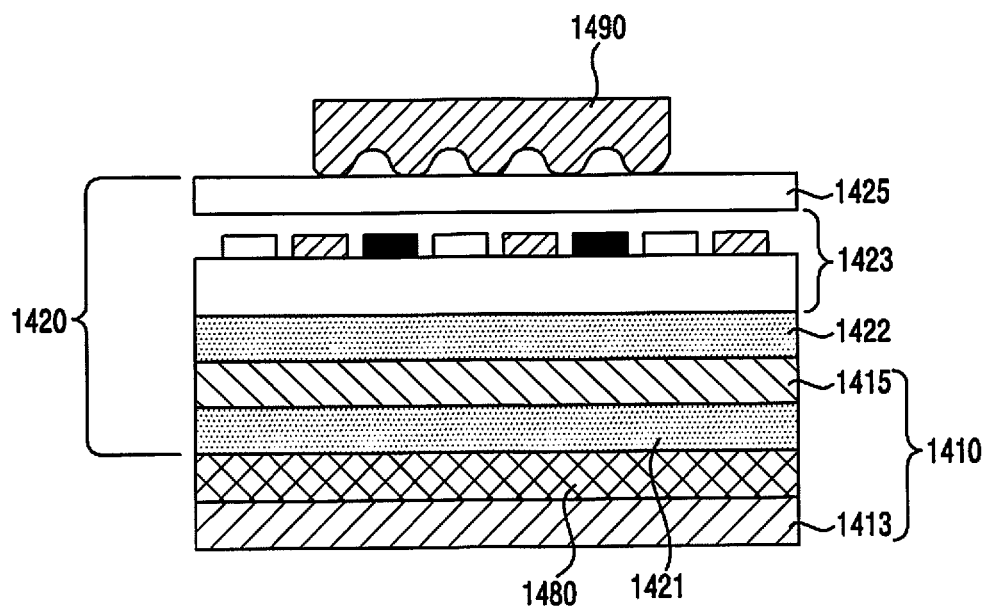
FIG. 14E illustrates arrangements of the display panel and the fingerprint recognition sensor in detail, according to an embodiment.

FIG. 14E is a view illustrating arrangements of the display panel and the fingerprint recognition sensor in detail, according to an embodiment.

Referring to FIG. 14E, a part of the fingerprint sensor 1410 is included in the display module 1420. The display module 1420 may be disposed on the additional stacking material 1480. The display module 1420 may include the substrate 1421 disposed on the additional stacking material 1480, the signal transmission layer 1415 disposed on the substrate 1421, the TFT pattern layer 1422 disposed on the signal transmission layer 1415, the pixel layer 1423 disposed on the TFT pattern layer 1422, and the transparent plate 1425 disposed on the pixel layer 1423.

The fingerprint sensor 1410 may include the signal transmission layer 1415 and the TFT fingerprint sensor panel 1413. The signal transmission layer 1415 may be disposed between the TFT pattern layer 1422 and the substrate 1421. For example, the signal transmission layer 1415 formed with a pin hole or a lens may be disposed under the TFT pattern layer 1422, and the substrate 1421 may be disposed under the signal transmission layer 1415. The additional stacking material 1480 may be stacked on one surface of the TFT fingerprint sensor panel 1413, and the substrate 1421 may be stacked on one surface of the additional stacking material 1480. The additional stacking material 1480 may be stacked on a surface of the TFT fingerprint sensor panel 1413, and may be attached to the substrate 1421.

Figure 14F:
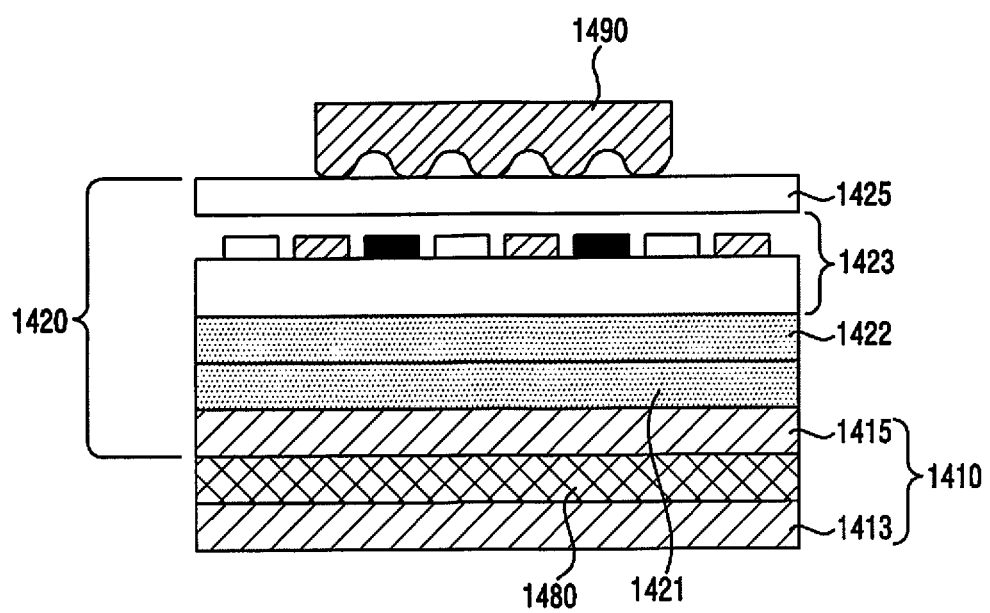
FIG. 14F illustrates arrangements of the display panel and the fingerprint recognition sensor in detail, according to an embodiment.

FIG. 14F is a view illustrating arrangements of the display panel and the fingerprint recognition sensor in detail, according to an embodiment.

Referring to FIG. 14F, a part of the fingerprint sensor 1410 is included in the display module 1420. The display module 1420 may include the substrate 1421, the signal transmission layer 1415 stacked on the substrate 1421, the TFT pattern layer 1422 stacked on the signal transmission layer 1415, the pixel layer 1423 stacked on the TFT pattern layer 1422, and the transparent plate 1425 formed on the pixel layer 1423. The fingerprint sensor 1410 may include the signal transmission layer 1415 and the TFT fingerprint sensor panel 1413. The signal transmission layer 1415 including a pin hole, a collimator, or a lens may be disposed between the substrate 1421 and the additional stacking material 1480, and may be included in the display 1420. The additional stacking material 1480 may be stacked on a surface of the TFT fingerprint sensor panel 1413, and may be attached the signal transmission layer 1415.

Figure 14G:
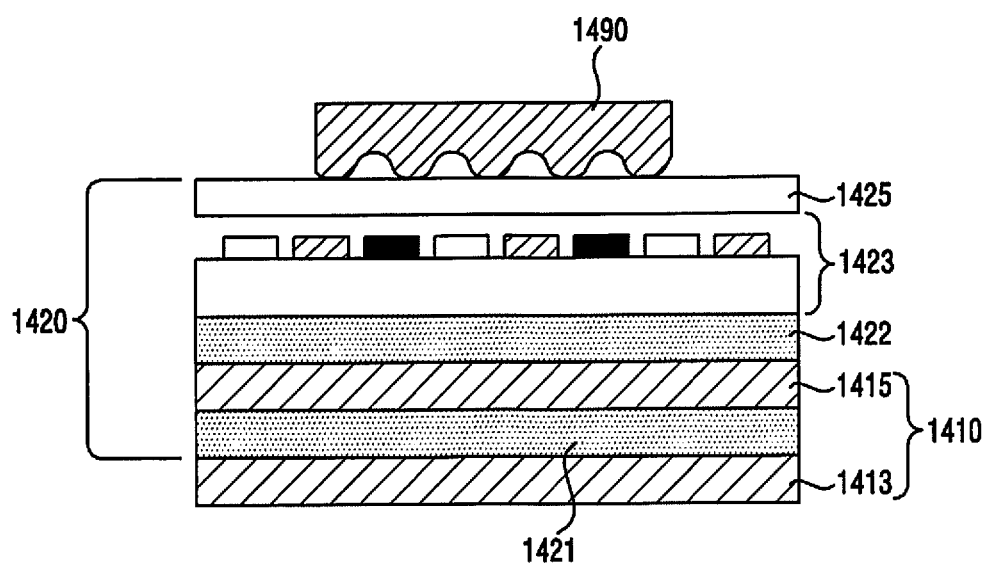
FIG. 14G illustrates arrangements of the display panel and the fingerprint recognition sensor in detail, according to an embodiment.

FIG. 14G is a view illustrating arrangements of the display panel and the fingerprint recognition sensor in detail, according to an embodiment.

Referring to FIG. 14G, a part of the fingerprint sensor 1410 is included in the display module 1420. The display module 1420 may include the substrate 1421, the signal transmission layer 1415 disposed on the substrate 1421, the TFT pattern layer 1422 disposed on the signal transmission layer 1415, the pixel layer 1423 disposed on the TFT pattern layer 1422, and the transparent plate 1425 disposed on the pixel layer 1423.

The fingerprint sensor 1410 may include the signal transmission layer 1415 and the TFT fingerprint sensor panel 1413. The signal transmission layer 1415 may be disposed between the TFT pattern layer 1422 and the substrate 1421. For example, the signal transmission layer 1415 formed with a pin hole may be disposed under the TFT pattern layer 1422, and the substrate 1421 may be disposed under the signal transmission layer 1415, such that the signal transmission layer 1415 may be included in the display 1420 region. The substrate 1421 may be stacked on the TFT fingerprint sensor panel 1413.

Figure 15:
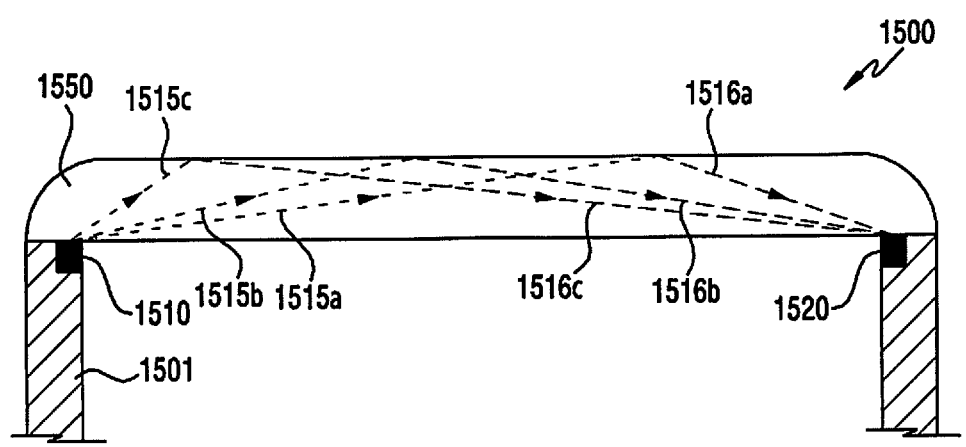
FIG. 15 illustrates an arrangement of a fingerprint sensor disposed on a sidewall of an electronic device, according to an embodiment.

FIG. 15 is a view illustrating an arrangement of a fingerprint sensor disposed on a sidewall of an electronic device, according to an embodiment.

Referring to FIG. 15, an electronic device 1500 includes a sidewall 1501 of a housing, a transparent plate 1550, a first sensor 1510, or a second sensor 1520.

The sidewall 1501 of the housing may include the transparent plate 1550 attached to one end of the sidewall of the housing, and a rear surface plate spaced apart from the transparent plate 1550 to be attached to or integrally formed with the other end of the housing. The sidewall 1501 of the housing, the transparent plate 1550, and the rear surface plate may define an inner space, and a display, a memory, and a printed circuit board including a processor may be arranged in the inner space.

The sidewall 1501 of the housing may include a seating recess formed on one end thereof to have the first sensor 1510 or the second sensor 1520 disposed therein. The first sensor 1510 may be a transmission sensor to transmit a signal such as light or ultrasonic waves, and the second sensor 1520 may be a reception sensor to receive transmitted signals. The first sensor 1510 and the second sensor 1520 may be an ultrasonic fingerprint sensor or an optical fingerprint sensor.

The light or ultrasonic waves emitted from the first sensor 1510 may be discharged through various paths. A signal emitted through a first transmission path 1515*a* may be reflected from an external object 1490 and may be transmitted to the second sensor 1520 through a first reception path 1516*a*. A signal emitted from the first sensor 1510 through a second transmission path 1515*b* or a third transmission path 1515*c* may be transmitted to the second sensor 1520 through a second reception path 1516*b* or a third reception path 1516*c*.

The first sensor 1510 may generate signals through various paths, and the second sensor 1520 may receive signals transmitted through various paths. For example, the signals transmitted through various paths enable fingerprint recognition on the whole area of the transparent plate 1550, and various patterns may be performed through the fingerprint recognition as shown in FIGS. 3A, 3B, 3C, 4A, 4B, 4C, 5, 6, 7, 8, 9, 10, 11, and 12.

Figure 16A:
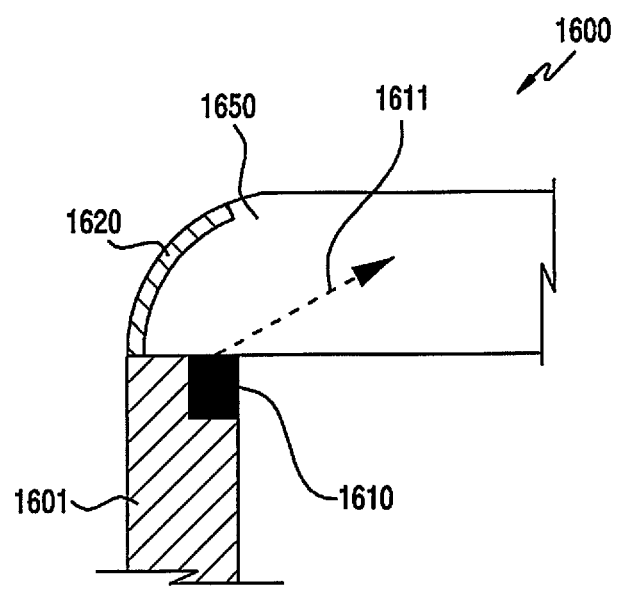
FIG. 16A illustrates an arrangement of a fingerprint sensor on a curved display in the electronic device of FIG. 15, according to an embodiment.

FIG. 16A is a view illustrating an arrangement of a fingerprint sensor on a curved display in the electronic device of FIG. 15, according to an embodiment.

Referring to FIG. 16A, a fingerprint sensor 1610 is disposed on a part of one end of a sidewall 1601 of a housing, and a transparent plate 1650 may be a plate having a curved portion. A masking may be formed on a part of the curved portion of the transparent plate 1650 to make the fingerprint sensor 1610 invisible from the outside. A signal transmission path 1611 may be set to allow light or a signal emitted from the fingerprint sensor 1610 to advance toward a plane portion of the transparent plate 1650.

The signal transmission path 1611 may be adjusted by a transmission member included in the fingerprint sensor 1610. The transmission member may be an optical member such as a reflection member or a lens member, or may be a mechanical structure such as a pin hole.

Figure 16B:
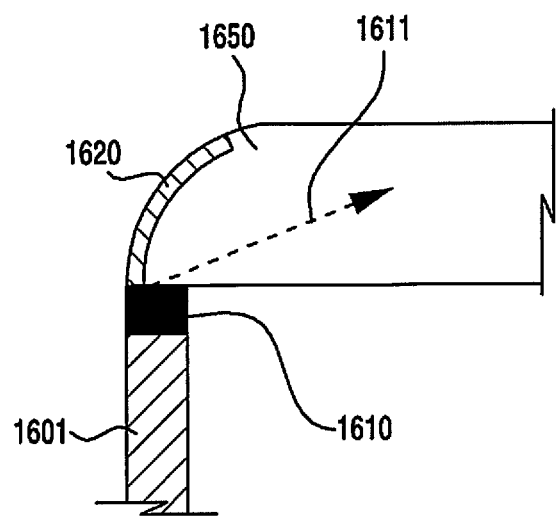
FIG. 16B illustrates an arrangement of the fingerprint sensor on the curved display in the electronic device of FIG. 15, according to an embodiment.

FIG. 16B is a view illustrating the arrangement of the fingerprint sensor on the curved display in the electronic device of FIG. 15, according to an embodiment.

Referring to FIG. 16B, the fingerprint sensor 1610 is disposed between the sidewall 1601 of the housing and the transparent plate 1650, and may be formed to correspond to a shape of an end of the sidewall 1601 of the housing, which is different from FIG. 16A.

The fingerprint sensor 1610 may be disposed in a seating recess on one side of the sidewall 1601 of the housing as shown in FIG. 16A, and may be disposed on an end of the sidewall 1601 of the housing on the other side of the sidewall 1601 of the housing as shown in FIG. 16B. The fingerprint sensor 1610 may form a closed curve along the sidewall 1601 of the housing to be disposed in a shape corresponding to a border of the housing, or may be disposed only on a part of the sidewall 1601 of the housing.

Figure 17:
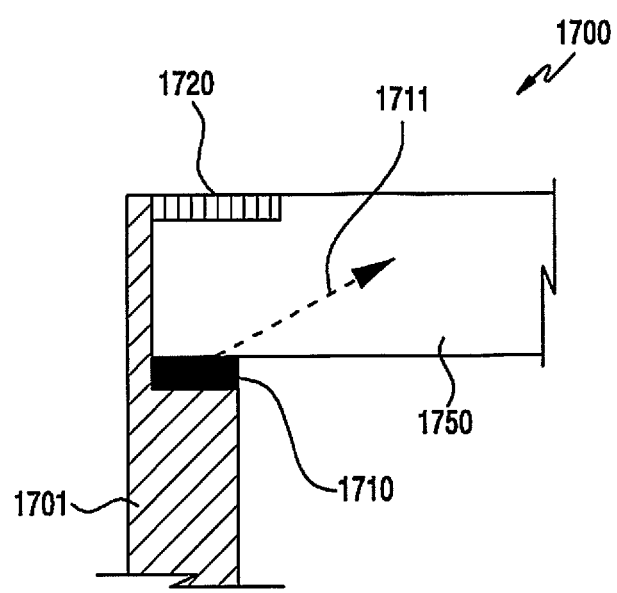
FIG. 17 illustrates an arrangement of a fingerprint on a flat panel display in the electronic device of FIG. 15, according to an embodiment.

FIG. 17 is a view illustrating the arrangement of a fingerprint on a flat panel display in the electronic device of FIG. 15, according to an embodiment.

Referring to FIG. 17, a fingerprint sensor 1710 is seated in a seating portion stepped up from a sidewall 1701 of a housing. The fingerprint sensor 1710 may be disposed on a lower portion of a transparent plate 1750, and may generate light or ultrasonic waves toward a path 1711 which faces an upper surface of the transparent plate 1750. The fingerprint sensor 1710 may transmit a signal to an external object disposed on an upper surface of the transparent plate through a lower surface of the transparent plate. A masking member 1720 may be disposed on a region of the transparent plate 1750 corresponding to the fingerprint sensor 1710. The masking member 1720 may prevent the fingerprint sensor 1710 from being visible from the outside.

Referring to FIG. 17, the fingerprint sensor 1710 may be seated in a stepped portion of the sidewall 1701 of the housing, and may be disposed between a side surface of the sidewall 1701 of the housing and a side surface of the transparent plate 1750. The fingerprint sensor 1710 may generate light or ultrasonic waves toward the path 1711 facing the upper surface of the transparent plate 1750, and may transmit a signal to an external object disposed on the upper surface of the transparent plate through the side surface of the transparent plate 1750. A masking member 1720 may be formed on a portion of the transparent plate that is in contact with the sidewall 1701 of the housing, and can prevent the sidewall 1701 of the housing from being visible from the outside. A surface of the fingerprint sensor 1710 that is exposed to the outside may be coated in the same color as the masking member 1720 or in the same color or with the same material as the sidewall 1701 of the housing, such that the electronic device can be seen as being formed seamlessly and as one element when viewed from the outside.

According to an embodiment, an electronic device may include a display, a memory configured to store instructions, a fingerprint sensor configured to obtain fingerprint images regarding a finger contacting the display, and a processor, and when executing the instructions, the processor may be configured to, while displaying a first screen on the display, receive a drag input from a user's finger contacting the display; obtain fingerprint images regarding the finger by using the fingerprint sensor while the drag input is maintained; and, based on identifying that the fingerprint images respectively match reference fingerprint images, display a second screen converted from the first screen at least partially on the display.

The fingerprint images may have patterns formed by some of a plurality of ridges and some of a plurality of valleys constituting a fingerprint in the finger, and the patterns may be different from one another.

The electronic device may further include a grip sensor, and when executing the instructions, the processor may further be configured to, in response to detecting that the drag input starts, identify a grip state of the electronic device by using the grip sensor; identify the reference fingerprint images corresponding to the grip state of the electronic device from among a plurality of reference fingerprint images registered in the electronic device; and, based on identifying that the fingerprint images respectively match the identified reference fingerprint images, display the second screen converted from the first screen on the display.

When executing the instructions, the processor may further be configured to identify a path of the drag input while obtaining the fingerprint images; and, in response to identifying that the fingerprint images respectively match the reference fingerprint images, and that the identified path matches a reference path pre-registered in the electronic device, display the second screen converted from the first screen at least partially on the display.

When executing the instructions, the processor may further be configured to identify a path of the drag input while obtaining the fingerprint images; in response to identifying that the fingerprint images respectively match the reference fingerprint images, execute an application indicated by the identified path from among a plurality of applications installed in the electronic device; and, in response to executing the application, display the second screen converted from the first screen at least partially on the display, wherein the second screen comprises a user interface of the executed application.

The processor may further be configured to obtain the fingerprint images regarding the finger by using the fingerprint sensor while the drag input is maintained; in response to detecting that the drag input is released, identify whether another drag input subsequent to the drag input is received within a designated time; receive the another drag input within the designated time; obtain other fingerprint images regarding the finger by using the fingerprint sensor while the another drag input is maintained; and, based on identifying that the fingerprint images and the other fingerprint images respectively match the reference fingerprint images and other reference fingerprint images, display the second screen converted from the first screen at least partially on the display.

When executing the instructions, the processor may further be configured to identify a path of the drag input while obtaining the fingerprint images; identify a path of the another drag input while obtaining the other fingerprint images; and, in response to identifying that the fingerprint images and the other fingerprint images respectively match the reference fingerprint images and the other reference fingerprint images, and that the path of the drag input and the path of the another drag input respectively match a reference path and other reference paths registered in the electronic device, display the second screen converted from the first screen at least partially on the display.

When executing the instructions, the processor may further be configured to identify a path of the drag input while obtaining the fingerprint images; identify a path of the another drag input while obtaining the other fingerprint images; in response to identifying that the fingerprint images and the other fingerprint images respectively match the reference fingerprint images and the other reference fingerprint images, execute an application indicated by the path of the drag input and the path of the another drag input from among a plurality of applications installed in the electronic device; and, in response to executing the application, display the second screen converted from the first screen at least partially on the display, wherein the second screen comprises a user interface of the executed application.

The reference fingerprint images may be stored in a secure region of the memory, and, when executing the instructions, the processor may further be configured to obtain information regarding the fingerprint images from the fingerprint sensor by using an application executed in a secure execution environment; and respectively compare the fingerprint images and the reference fingerprint images, within the secure execution environment by using the application; and, upon identifying that the fingerprint images match the reference fingerprint images by using the application, based on a result of the comparison, display the second screen converted from the first screen at least partially on the display.

The first screen may correspond to a lock screen indicating that the electronic device is in a lock state, or an AOD screen indicating that the electronic device is in an AOD state, and the second screen may correspond to another screen distinct from the lock screen or the AOD screen.

The lock state may be a state in which a functionality of the electronic device is limited to execution of only some functions supported by the electronic device, and the AOD state may be a state in which the processor is in a sleep state during a part of a time period in which the AOD screen is displayed on the display.

The processor may be in the sleep state while displaying the first screen corresponding to the AOD screen on the display, and, in response to detecting that the drag input starts, the processor may be switched from the sleep state to an active state.

The electronic device may further include a housing including a space to house the display, the fingerprint sensor mounted therein, and the fingerprint sensor may be disposed in the space of the housing to face the display to transmit a signal toward the display.

The fingerprint sensor may include at least some elements included in the display.

The electronic device may further include a front surface glass disposed on the display, and a housing disposed along the front surface glass to define a space to house the display, the fingerprint sensor mounted therein, and the fingerprint sensor may include a receiver and a transmitter, and the receiver and the transmitter may be disposed along a sidewall of the housing.

According to an embodiment, an electronic device may include a display, a memory configured to store instructions, a fingerprint sensor configured to obtain fingerprint images regarding a finger contacting the display, and a processor, and when executing the instructions, the processor may be configured to, while displaying a screen for registering fingerprint images, receive a drag input from a finger of a user contacting the display; obtain fingerprint images regarding the finger by using the fingerprint sensor while the drag input is maintained; and register the fingerprint images as reference fingerprint images for authenticating the user.

When executing the instructions, the processor may be further configured to identify a path of the drag input while obtaining the fingerprint images; and register the identified path as a reference path for authenticating the user, and the reference path may be used to authenticate the user along with the reference fingerprint images.

The processor may further be configured to, after registering the fingerprint images as the reference fingerprint images, receive another drag input from the finger contacting the display; obtain other fingerprint images regarding the finger by using the fingerprint sensor while the another drag input is maintained; and, upon identifying that the other fingerprint images respectively match the reference fingerprint images, release a lock state of the electronic device.

The electronic device may further include a housing including a space to house the display, the fingerprint sensor mounted therein, and the fingerprint sensor may be disposed in the space of the housing to face the display to transmit a signal toward the display.

The fingerprint sensor may include at least some elements included in the display.

Accordingly, the electronic device and the method thereof can provide an enhanced user experience by obtaining a plurality of pieces of fingerprint information from a drag input by using the fingerprint sensor disposed in the form of an in-display fingerprint sensor.

Methods based on the claims or the embodiments disclosed in the disclosure may be implemented in hardware, software, or a combination of both.

When implemented in software, a computer readable storage medium for storing one or more programs (i.e., software modules) may be provided. The one or more programs stored in the computer readable storage medium are configured for execution performed by one or more processors in an electronic device. The one or more programs include instructions for allowing the electronic device to execute the methods based on the claims or the embodiments disclosed in the disclosure.

The program (i.e., the software module or software) may be stored in a random access memory (RAM), a non-volatile memory including a flash memory, a read only memory (ROM), an electrically erasable programmable ROM (EEPROM), a magnetic disc storage device, a compact disc-ROM (CD-ROM), digital versatile discs (DVDs) or other forms of optical storage devices, and a magnetic cassette. Alternatively, the program may be stored in a memory configured in combination of all or some of these storage media. In addition, the configured memory may be plural in number.

Further, the program may be stored in an attachable storage device capable of accessing the electronic device through a communication network such as the Internet, an Intranet, an LAN, a wide LAN (WLAN), a storage area network (SAN), or a communication network configured by combining the networks. The storage device may be accessed via an external port to a device which performs the embodiments of the disclosure. In addition, an additional storage device on a communication network may provide access to a device which performs the embodiments of the disclosure.

In the above-described specific embodiments of the disclosure, elements included in the disclosure are expressed in singular or plural forms according to specific embodiments. However, singular or plural forms are appropriately selected according to suggested situations for convenience of explanation, and the disclosure is not limited to a single element or plural elements. An element which is expressed in a plural form may be configured in a singular form or an element which is expressed in a singular form may be configured in a plural form.

While the present disclosure has been particularly shown and described with reference to certain embodiments thereof, it will be understood by those of ordinary skill in the art that various changes in form and details may be made therein without departing from the spirit and scope of the disclosure as defined by the appended claims and their equivalents.

What is claimed is:

1. An electronic device comprising:
a display;
a memory configured to store instructions;
a fingerprint sensor; and
a processor, wherein, when executing the instructions, the processor is configured to:
display a first screen on the display;
receive a first drag input for dragging the display through a user's finger;
obtain first fingerprint information on the user's finger including a plurality of images of the user's finger by using the fingerprint sensor while the first drag input is being received;
identify a path of the first drag input while obtaining the first fingerprint information; and
in response to identifying that the first fingerprint information matches first reference fingerprint information, and the identified path matches a reference path pre-registered in the electronic device, display a second screen converted from the first screen at least partially on the display.

2. The electronic device of claim 1, wherein the first fingerprint information comprises a plurality of patterns formed by a part of a plurality of ridges and a part of a plurality of valleys constituting a fingerprint of the finger, and
wherein each of the plurality of patterns is different from one another.

3. The electronic device of claim 1, further comprising a grip sensor, and
wherein, when executing the instructions, the processor is further configured to:
in response to detecting that the first drag input starts, identify a grip state of the electronic device by using the grip sensor;
identify the first reference fingerprint information corresponding to the grip state of the electronic device from among a plurality of pieces of the first reference fingerprint information registered in the electronic device; and
based on identifying that fingerprint images match the identified first reference fingerprint information, display the second screen converted from the first screen on the display.

4. The electronic device of claim 1, wherein, when executing the instructions, the processor is further configured to:
identify a path of the first drag input while obtaining the first fingerprint information;
in response to identifying that the first fingerprint information matches the first reference fingerprint information, execute an application indicated by the identified path from among a plurality of applications installed in the electronic device; and
in response to executing the application, display the second screen converted from the first screen at least partially on the display,
wherein the second screen comprises a user interface of the executed application.

5. The electronic device of claim 1, wherein the processor is further configured to:
obtain the first fingerprint information regarding the finger by using the fingerprint sensor while the first drag input is maintained;
in response to detecting that the first drag input is released, identify whether a second drag input subsequent to the first drag input is received within a designated time;
receive the second drag input within the designated time;
obtain second fingerprint information regarding the finger by using the fingerprint sensor while the second drag input is maintained; and
upon identifying that the first fingerprint information and the second fingerprint information match the first reference fingerprint information and second reference fingerprint information, respectively, display the second screen converted from the first screen at least partially on the display.

6. The electronic device of claim 5, wherein, when executing the instructions, the processor is further configured to:
identify a path of the first drag input while obtaining the first fingerprint information;
identify a path of the second drag input while obtaining the second fingerprint information; and
in response to it being identified that the first fingerprint information and the second fingerprint information respectively match the first reference fingerprint information and the second reference fingerprint information, and that the path of the first drag input and the path of the second drag input respectively match a first reference path and a second reference path registered in the electronic device, display the second screen converted from the first screen at least partially on the display.

7. The electronic device of claim 5, wherein, when executing the instructions, the processor is configured to:
identify a path of the first drag input while obtaining the first fingerprint information;
identify a path of the second drag input while obtaining the second fingerprint information;
in response to identifying that the first fingerprint information and the second fingerprint information respectively match the first reference fingerprint information and the second reference fingerprint information, execute an application indicated by the path of the first drag input and the path of the second drag input from among a plurality of applications installed in the electronic device; and
in response to executing the application, display the second screen converted from the first screen at least partially on the display,
wherein the second screen comprises a user interface of the executed application.

8. The electronic device of claim 1, wherein the first reference fingerprint information is stored in a secure region of the memory, and
wherein, when executing the instructions, the processor is further configured to:
obtain information regarding the first fingerprint information from the fingerprint sensor by using an application executed in a secure execution environment; and
compare the first fingerprint information and the first reference fingerprint information within the secure execution environment by using the application; and
upon identifying that the first fingerprint information matches the first reference fingerprint information by using the application, based on a result of the comparison, display the second screen converted from the first screen at least partially on the display.

9. The electronic device of claim 1, wherein the first screen corresponds to a lock screen indicating that the electronic device is in a lock state, or an always on display (AOD) screen indicating that the electronic device is in an AOD state, and
wherein the second screen corresponds to another screen distinct from the lock screen or the AOD screen.

10. The electronic device of claim 9, wherein the lock state is a state in which a functionality of the electronic device is limited to execution of only some functions supported by the electronic device, and wherein the AOD state is a state in which the processor is in a sleep state during a part of a time period in which the AOD screen is displayed on the display.

11. The electronic device of claim 10, wherein the processor is in the sleep state while displaying the first screen corresponding to the AOD screen on the display, and
wherein, in response to detecting that the first drag input starts, a state of the processor is switched from the sleep state to an active state.

12. The electronic device of claim 1, further comprising a housing comprising a space to house the display having the fingerprint sensor mounted therein,
wherein the fingerprint sensor is disposed in the space of the housing to face the display to transmit a signal toward the display.

13. The electronic device of claim 1, wherein the fingerprint sensor comprises at least some elements included in the display.

14. The electronic device of claim 1, further comprising a front surface glass disposed on the display, and a housing disposed along the front surface glass to define a space to house the display having the fingerprint sensor mounted therein,
wherein the fingerprint sensor comprises a receiver and a transmitter, and
wherein the receiver and the transmitter are disposed along a sidewall of the housing.

15. An operating method of an electronic device, the method comprising:
displaying a screen for registering first fingerprint information;
while displaying the screen for registering the first fingerprint information, receiving a first drag input for dragging the display through a user's finger;
obtaining the first fingerprint information on the user's finger including a plurality of images of the user's finger by using a fingerprint sensor while the first drag input is being received;
identifying a path of the first drag input while obtaining the first fingerprint information; and
registering the first fingerprint information and the path of the first drag input as reference fingerprint information and a reference path for authenticating the user.

16. The method of claim 15, further comprising:
after registering the first fingerprint information as the reference fingerprint information, receiving a second drag input from the finger contacting the display;
obtaining second fingerprint information regarding the finger by using the fingerprint sensor while the second drag input is maintained; and
upon identifying that the second fingerprint information matches the reference fingerprint information, releasing a lock state of the electronic device.

17. The method of claim 16, further comprising:
identifying a path of the second drag input while obtaining the second fingerprint information;
upon identifying that the second fingerprint information matches the reference fingerprint information, executing an application indicated by the identified path from among a plurality of applications installed in the electronic device; and
in response to executing the application, after releasing the lock state, displaying a screen comprising a user interface of the executed application.

18. The method of claim 16, further comprising:
identifying a path of the second drag input while obtaining the second fingerprint information; and upon identifying that the second fingerprint information matches the reference fingerprint information, and that the identified path matches a reference path pre-registered in the electronic device, releasing the lock state of the electronic device.

* * * * *